United States Patent
Mercuri et al.

(10) Patent No.: US 10,938,548 B2
(45) Date of Patent: Mar. 2, 2021

(54) BLOCKCHAIN OBJECT DEPLOYMENT AND SYNCHRONIZATION ACROSS BLOCKCHAINS

(71) Applicant: Microsoft Technology Licensing, LLC, Redmond, WA (US)

(72) Inventors: Marc E. Mercuri, Seattle, WA (US); Zeyad Rajabi, Seattle, WA (US); Eric I. Maino, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 192 days.

(21) Appl. No.: 15/987,448

(22) Filed: May 23, 2018

(65) Prior Publication Data

US 2019/0013933 A1 Jan. 10, 2019

Related U.S. Application Data

(60) Provisional application No. 62/530,081, filed on Jul. 7, 2017.

(51) Int. Cl.
*H04L 29/06* (2006.01)
*H04L 9/06* (2006.01)
(Continued)

(52) U.S. Cl.
CPC ............ *H04L 9/0637* (2013.01); *G06F 9/451* (2018.02); *G06F 9/542* (2013.01); *G06F 9/546* (2013.01); *G06F 11/3072* (2013.01); *G06F 11/3476* (2013.01); *G06F 16/212* (2019.01); *G06F 16/27* (2019.01); *G06F 16/904* (2019.01); *G06F 21/602* (2013.01);
*G06F 21/645* (2013.01); *G06N 20/00* (2019.01); *G06Q 20/02* (2013.01); *G06Q 20/06* (2013.01);
(Continued)

(58) Field of Classification Search
CPC ... H04L 9/0637; H04L 9/0643; H04L 9/3236; H04L 9/3239; G06F 21/602; G06F 21/645
USPC .......................................... 173/170; 713/170
See application file for complete search history.

(56) References Cited

U.S. PATENT DOCUMENTS 6,161,139 A   12/2000  Win et al.
7,554,542 B1 * 6/2009  Ferraro ................. G06T 13/205
                                                  345/427
(Continued)

FOREIGN PATENT DOCUMENTS

WO    2017098519 A1    6/2017

OTHER PUBLICATIONS

"Convergent Encryption", Retrieved From: https://en.wikipedia.org/w/index.php?title=Convergent_encryption&oldid=659260002, Apr. 26, 2015, 2 Pages.
(Continued)

*Primary Examiner* — Longbit Chai
(74) *Attorney, Agent, or Firm* — Mannava & Kang, P.C.

(57) ABSTRACT

An event interface system facilitates the creation and deployment of a first blockchain object and a second blockchain object on a first blockchain and a second blockchain respectively. The system also provides an interface between the first blockchain object and the second blockchain object via the event hub. Additionally, the system can allow interaction between blockchain objects on a private blockchain and a participant on the system.

20 Claims, 13 Drawing Sheets

(51) Int. Cl.

| | | |
|---|---|---|
| *G06Q 20/06* | (2012.01) | |
| *G06F 21/60* | (2013.01) | |
| *H04L 9/32* | (2006.01) | |
| *G06F 21/64* | (2013.01) | |
| *G06Q 20/38* | (2012.01) | |
| *G06Q 20/40* | (2012.01) | |
| *G06Q 20/02* | (2012.01) | |
| *G06F 16/904* | (2019.01) | |
| *G06N 20/00* | (2019.01) | |
| *G06F 11/30* | (2006.01) | |
| *G06F 11/34* | (2006.01) | |
| *G06F 9/451* | (2018.01) | |
| *G06F 16/21* | (2019.01) | |
| *G06F 9/54* | (2006.01) | |
| *G06F 16/27* | (2019.01) | |
| *G06N 3/08* | (2006.01) | |
| *H04W 4/70* | (2018.01) | |

(52) U.S. Cl.
CPC ....... *G06Q 20/3827* (2013.01); *G06Q 20/405* (2013.01); *H04L 9/0643* (2013.01); *H04L 9/3236* (2013.01); *H04L 9/3239* (2013.01); *H04L 9/3242* (2013.01); *H04L 9/3247* (2013.01); *H04L 9/3265* (2013.01); *H04L 63/101* (2013.01); *H04L 63/102* (2013.01); *H04L 63/123* (2013.01); *G06N 3/08* (2013.01); *G06Q 2220/00* (2013.01); *H04L 2209/38* (2013.01); *H04L 2209/56* (2013.01); *H04W 4/70* (2018.02)

(56) References Cited

U.S. PATENT DOCUMENTS

| | | | |
|---|---|---|---|
| 8,364,955 | B1 | 1/2013 | Sharma et al. |
| 10,084,762 | B2* | 9/2018 | Versteeg ............... H04W 12/06 |
| 10,581,847 | B1 | 3/2020 | Sun et al. |
| 2006/0248083 | A1 | 11/2006 | Sack et al. |
| 2009/0083768 | A1 | 3/2009 | Hatalkar et al. |
| 2012/0237022 | A1 | 9/2012 | Berson et al. |
| 2015/0067154 | A1 | 3/2015 | Ly et al. |
| 2016/0275526 | A1 | 9/2016 | Becanovic |
| 2016/0292672 | A1 | 10/2016 | Fay et al. |
| 2016/0300234 | A1 | 10/2016 | Moss-pultz et al. |
| 2017/0005804 | A1 | 1/2017 | Zinder |
| 2017/0041296 | A1 | 2/2017 | Ford et al. |
| 2017/0046651 | A1 | 2/2017 | Lin et al. |
| 2017/0124556 | A1 | 5/2017 | Seger, II |
| 2017/0126702 | A1 | 5/2017 | Krishnamurthy |
| 2017/0236094 | A1 | 8/2017 | Shah |
| 2017/0352027 | A1* | 12/2017 | Zhang ................... H04L 9/0825 |
| 2017/0353309 | A1 | 12/2017 | Gray |
| 2018/0005186 | A1 | 1/2018 | Hunn |
| 2018/0025181 | A1 | 1/2018 | Barinov et al. |
| 2018/0039667 | A1 | 2/2018 | Pierce et al. |
| 2018/0137465 | A1 | 5/2018 | Batra et al. |
| 2018/0191502 | A1 | 7/2018 | Karame |
| 2018/0191503 | A1 | 7/2018 | Alwar et al. |
| 2018/0205555 | A1 | 7/2018 | Watanabe et al. |
| 2018/0218003 | A1 | 8/2018 | Banga et al. |
| 2018/0225640 | A1 | 8/2018 | Chapman et al. |
| 2018/0227116 | A1 | 8/2018 | Chapman et al. |
| 2018/0260888 | A1 | 9/2018 | Paolini-subramanya et al. |
| 2018/0285971 | A1 | 10/2018 | Rosenoer |
| 2018/0308072 | A1 | 10/2018 | Smith et al. |
| 2018/0313798 | A1 | 11/2018 | Chokshi et al. |
| 2018/0314809 | A1 | 11/2018 | Mintz et al. |
| 2018/0315141 | A1 | 11/2018 | Hunn et al. |
| 2018/0315145 | A1 | 11/2018 | Darnell et al. |
| 2018/0322587 | A1 | 11/2018 | Linne |
| 2019/0012249 | A1 | 1/2019 | Mercuri et al. |
| 2019/0013932 | A1 | 1/2019 | Maino et al. |
| 2019/0013934 | A1 | 1/2019 | Mercuri et al. |
| 2019/0013948 | A1 | 1/2019 | Mercuri et al. |
| 2019/0058592 | A1 | 2/2019 | Wright et al. |

OTHER PUBLICATIONS

"Getting Smart: Contracts on the Blockchain", Retrieved From: https://www.iif.com/system/files/32370132_smartcontracts_report_may_2016_vf.pdf, May 2016, pp. 1-11.

Adams, Tori, "Blockchain, Smart Contracts, and Health: Booz Allen Hamilton and the Blockchain Revolution", Retrieved From: https://www.linkedin.com/pulse/blockchain-smart-contracts-health-booz-allen-hamilton-tori-adams, Dec. 11, 2015, 7 Pages.

Eufemio, et al., "Digix's Whitepaper: The Gold Standard in Crypto-Assets", Retrieved From: https://digix.global/whitepaper.pdf, Jan. 2016, 22 Pages.

Gantait, et al., "Implementing Blockchain for Cognitive IoT Applications, Part 2: Use Vehicle Sensor Data to Execute Smart Transactions in Blockchain", Retrieved From: https://www.ibm.com/developerworks/cloud/library/cl-blockchain-for-cognitive-iot-apps2/index.html, Jun. 5, 2017, pp. 1-17.

Hull, et al., "Towards a Shared Ledger Business Collaboration Language Based on Data-Aware Processes", In Proceedings of the International Conference on Service-Oriented Computing, Oct. 10, 2016, pp. 18-36.

Panikkar, et al., "ADEPT: An IoT Practitioner Perspective", Retrieved From: https://archive.org/stream/pdfy-esMcC00dKmdo53-_/IBM%ADEPT%20Practictioner%20Perspective%20-%20Pre%20Publication%20Draft%20-%207%20Jan%202015_djvu.txt, Jan. 7, 2015, pp. 1-18.

"International Search Report and Written Opinion Issued in PCT Application No. PCT/US2018/040077", dated Oct. 10, 2018, 16 Pages.

"International Search Report and Written Opinion Issued in PCT Application No. PCT/US2018/040087", dated Oct. 10, 2018, 14 Pages.

"International Search Report and Written Opinion Issued in PCT Application No. PCT/US2018/040096", dated Oct. 10, 2018, 16 Pages.

"International Search Report and Written Opinion Issued in PCT Application No. PCT/US2018/040103", dated Oct. 11, 2018, 14 Pages.

"International Search Report and Written Opinion Issued in PCT Application No. PCT/US2018/040108", dated Oct. 10, 2018, 16 Pages.

Weber, et al., "Untrusted Business Process Monitoring and Execution Using Blockchain", In Proceeding of the International Conference on Business Process Management, Sep. 18, 2016, pp. 329-347.

"Non-Final Office Action Issued in U.S. Appl. No. 15/957,458", dated Feb. 21, 2020, 15 Pages.

"Non Final Office Action Issued in U.S. Appl. No. 15/995,062", dated May 21, 2020, 31 Pages.

"Non Final Office Action Issued in U.S. Appl. No. 15/995,078", dated May 14, 2020, 17 Pages.

"Non Final Office Action Issued in U.S. Appl. No. 15/995,070", dated Jul. 15, 2020, 29 Pages.

"Notice of Allowance Issued in U.S. Appl. No. 15/957,458", dated Sep. 3, 2020, 9 Pages.

"Final Office Action Issued in U.S. Appl. No. 15/995,078", dated Sep. 25, 2020, 18 Pages.

"Final Office Action Issued in U.S. Appl. No. 15/995,062", dated Oct. 29, 2020, 32 Pages.

"Final Office Action Issued in U.S. Appl. No. 15/995,070", dated Dec. 14, 2020, 40 Pages.

* cited by examiner

CONFIGURATION FILE 198

```
"Properties": {
    "State": {
        "Type": "state"
    },
    "Owner": {                          ← 302
        "Type": "user"
    },
    "Description": {
        "Type": "string"
    },
    "AskingPrice": {
        "Type": "money"
    },
    "Buyer": {                          ← 304
        "Type": "user"
    },
    "offerPrice": {
        "Type": "money"
    },
    "Inspector": {                      ← 306
        "Type": "user"
    },
    "Appraiser": {                      ← 308
        "Type": "user"
    }
},
```

```
"StateProperty": "State",
"StateMapping"{
    "Created" : 0,
    "Active" : 1,
    "OfferPlaced" :2,
    "PendingInspection":3,
    "Inspected":4,
    "Appraised":5,
    "NotionalAcceptance":6,
    "BuyerAccepted":7,
    "SellerAccepted":8,
    "Accepted": 9,
    "Complete": 10,
    "Terminated": 11
},
```

BLOCKCHAIN OBJECT 108X and/or 108Y

```
enum AssetState { Active, OfferPlaced, PendingInspection
Inspected, Appraised, Accepted, Complete }
address public Owner;            ← 302
string public Descrption;
uint public AskingPrice;
AssetState State;

address public Buyer;            ← 304
uint public OfferPrice;
address public Inspector;        ← 306
address public Appraiser;        ← 308
```

FIGURE 6

NORTHWIND TRADERS
ADAM SMITH                LOGOUT

ACTIONS 778

| REJECT | TERMINATE | | ACCEPT OFFER |

CONTACTS 711

ADAM SMITH
OWNER 302
CONTACT

CARLOS CLACIUS
BUYER 304
CONTACT

JIM CHANOS
INSPECTOR 306
CONTACT

CHARLES MACKAY
APPRAISER 308
CONTACT

YOUR ASSET TRANSFER 702
STATE : OFFER PLACED
OWNER: ADAM SMITH
DESCRIPTION: FORD MODEL T
ASK:     $3,000,000
BUYER: CARLOS CLACIUS
OFFER: $2,999,000
INSPECTOR: JIM CHANOS
APPRAISER: CHARLES MACKAY

STATE: OFFER PLACED — 712

FIGURE 8

BLOCKCHAIN CLIENT　　　ADAM SMITH　　　LOGOUT

NOTIFICATIONS 902

| RESCIND OFFER |
|---|
| Contract has been Modified |

| VIEW |
|---|

YOUR ASSET TRANSFERS 904

| CREATE NEW CONTRACT |
|---|

| STATE | OWNER | DESCRIPTION | ASK | BUYER | OFFER | INSPECTOR | APPRAISER |
|---|---|---|---|---|---|---|---|
| ACTIVE | ADAM SMITH | FORD MODEL T | $3,000,000 | JOHN GALT | $33,000 | JIM CHANOS | THOMAS JEFFERSON |
| ACTIVE | ADAM SMITH | TESLA MODEL S | $60,000 | | | | |
| OFFER PLACED | THOMAS FRIEDMAN | TESLA MODEL C | $55,000 | ADAM SMITH | $33,000 | JIM CHANOS | THOMAS JEFFERSON |
| INACTIVE | PRESTON TUCKER | TUCKER | $8,005,000 | JOHN GALT | $8,000,000 | JIM CHANOS | THOMAS JEFFERSON |
| ACTIVE | FERDINAND PORSCHE | PORSCHE 911 | $150,000 | | | | |
| ACTIVE | FREDRICK MAYTAG | MAYTAG | $1,000,000 | | | | |
| ACTIVE | CHARLES ROLLS | ROLLS ROYCE | $799,000 | | | | |
| ACTIVE | KARL BENZ | MERCEDES C300DS | $5,000 | | | | |
| ACTIVE | ENZO FERRARI | FERRARI | $5,000,000 | JOHN GALT | $5,000,000 | JIM CHANOS | THOMAS JEFFERSON |
| ACTIVE | JOHN DODGE | DODGE | $95,000 | | | | |
| ACTIVE | THOMAS FRIEDMAN | SPEED RACER | $99,000,000 | TATSUO YOSHIDA | $99,000,000 | GADGET | LODE RUNNER |

FIGURE 9B

BLOCKCHAIN OBJECT DEPLOYMENT AND SYNCHRONIZATION ACROSS BLOCKCHAINS

CROSS-REFERENCE TO RELATED APPLICATION

This application claims the benefit of priority to U.S. Provisional Application Ser. No. 62/530,081 having the title "Smart Instrument Manager Portal" filed Jul. 7, 2017, the disclosure of which is hereby incorporated by reference in its entirety.

TECHNICAL FIELD

The technology described herein relates to a computer system that interfaces with a blockchain to store data and interact with blocks on the blockchain.

BACKGROUND

Blockchain systems have been proposed for a variety of application scenarios, including applications in the financial industry, healthcare, emerging markets, and so forth. An early example of a blockchain was a cryptocurrency. The cryptocurrency was generated when new blocks were created on the blockchain to confirm transactions of the cryptocurrency. The new blocks may confirm the transfer of cryptocurrency generated in earlier blocks. The blocks on the blockchain were cryptographically proofed and linked to earlier blocks and served as an immutable record of the events in a trustless decentralized peer-to-peer network. For example, a cryptocurrency (e.g., bitcoin) is represented as a chain of events that transfers ownership from one party to another party on a blockchain without an intermediary. Each event transferring ownership from one party to another is cryptographically proofed by including the public key of the new owner. Also, each event is digitally signed with the current owner's private key.

A new block in a blockchain is filled with cryptographically proofed events until the block reaches a specified size limit. A hash digest of all the event identifiers within the block and the block header of the previous block are added as the first event in the block. Each block of events may be secured by a race between participants on a peer-to-peer network. In order to win the race the participants collect new events to create the new block, validate the events on the new block by verifying the cryptographic proofs of each event to verify the cryptocurrency was not spent earlier, and finally solve a mathematical puzzle based on the hash digest, previous block header and a random number. Blockchain provides a mathematical hierarchy of verifiable events that is immutable and is verified at each stage by the race between the participants. Other consensus protocols may be used to secure the blocks instead of the cryptographic race. Examples of consensus protocols include proof of work, proof of useful work, proof of stake, gossip about gossip and the like.

After blockchain was applied for cryptocurrency, the principles used in the early blockchain were modified to allow execution of smart contracts deployed on the blockchain. Smart Contracts are self-executing machine-readable instructions that can store state information and are stored on the blockchain. When deployed, the smart contract is assigned a unique address to allow communication to and from the smart contract through messages. The smart contract is deployed by storing the smart contract as an event on the blockchain (e.g., Ethereum™ blockchain). Messages to the smart contract may be posted as events on the blockchain. The smart contract may contain machine-readable instructions and data designed to execute on virtual machines. The smart contract may have the ability to read or write to its internal storage storing data, read the storage of a received message, send messages to other smart contracts to trigger execution of the code in other distributed applications. When the smart contract is executed on a virtual machine running on the peers securing the blockchain, the resulting data may be saved in the internal storage of the smart contract. The updated smart contract may be stored as an event on a new block. Thus, the smart contract and changes to data, i.e., state of the smart contract, are represented as a series of events on the blockchain. Similar to the cryptocurrency blockchain, each block in the blockchain by mining the blockchain by peers based on a consensus protocol.

For example, in a smart contract that governs a sale of an electronic asset, the smart contract may include machine-readable instructions to access its internal storage, machine-readable instructions to read the storage of a message sent to the smart contract and machine-readable instructions to process the data in a received message such as a counter-offer from a buyer. When the buyer sends a counter-offer to the smart contract, the smart contract may update its internal storage to include the counter-offer event, such as the identity of the buyer, the counter-offer price etc. The updated smart contract may be recorded as an event (e.g., a transaction) on a new block on the blockchain. In other words, the blockchain stores the changes in state of the smart contract as a series of events (e.g. a transaction). In an example, the blockchain may use a consensus algorithm that incentivizes peers to execute the smart contract in a virtual machine and record the changes to the internal storage in the smart contract, i.e., state of the smart contract to create new blocks.

The smart contract (e.g., a smart contract) may allow the administration and enforcement of some or all of the obligations and liabilities of the participants that may interact with the smart contract. One smart contract may use a second smart contract, called a utility smart contract, to provide a library of functions to other smart contracts. In an example, a utility smart contract may obtain updates on conditions that may affect the obligations and liabilities of the parties to the smart contract such as loan rates. However, smart contracts in a blockchain such as Ethereum™ ran on all peers involved in securing the events on the blockchain, increasing the cost of producing an immutable record of an event on the blockchain. Also, the smart contract in the blockchain may include code and data accessible to everyone by retrieving the blockchain.

Many blockchain implementations have emerged. There are currently over eighty different kinds of blockchains. Support for smart contracts varies in the different blockchains. Even among the blockchain implementations that support smart contracts, the available features vary.

Using smart contracts and the blockchain poses technical challenges for even the savviest participants. For example, the current block in the blockchain contains events that were received by a peer within a certain period. Therefore, the blocks may contain random events, without any other relationship to each other. Similarly, the events (e.g., a transaction) may relate to smart contracts or other smart contracts that are present in previous blocks in the blockchain. For example, the smart contracts may be identified by an identifying address or number, stored in a block of the blockchain. The smart contract may be packed into blocks optimized to meet block size limitations for retrieval. The smart contract stored on the block may be difficult to locate because of the lack of organization of the events recorded in each block. Also, different smart contract versions may be stored in multiple blocks, often on incompatible blockchain implementations (e.g., hard-forks). Similarly, events on the blockchain may be secured with cryptographic keys to interact with the smart contract.

Furthermore, blockchain enterprise applications are difficult to implement because they require knowledge of cryptography, knowledge of peer-to-peer systems, and knowledge of specialized languages used in blockchain smart contracts, which prevents people with enterprise expertise from building applications on the blockchain. Other technical issues associated with blockchains include interfacing an application on the blockchain to already existing technologies, such as reporting services, analytics, databases, data storage, artificial intelligence and the like.

BRIEF DESCRIPTION OF THE DRAWINGS

Features of the present disclosure are illustrated by way of example and not limited in the following Figure(s), in which like numerals indicate like elements, in which:

FIG. 6 shows an example of a blockchain object and a corresponding context schema instance, according to an embodiment of the present disclosure;

FIGS. 7, 8, 9A and 9B show examples of a user interface for interacting with a blockchain object, according to embodiments of the present disclosure.

DETAILED DESCRIPTION

Figure 1:
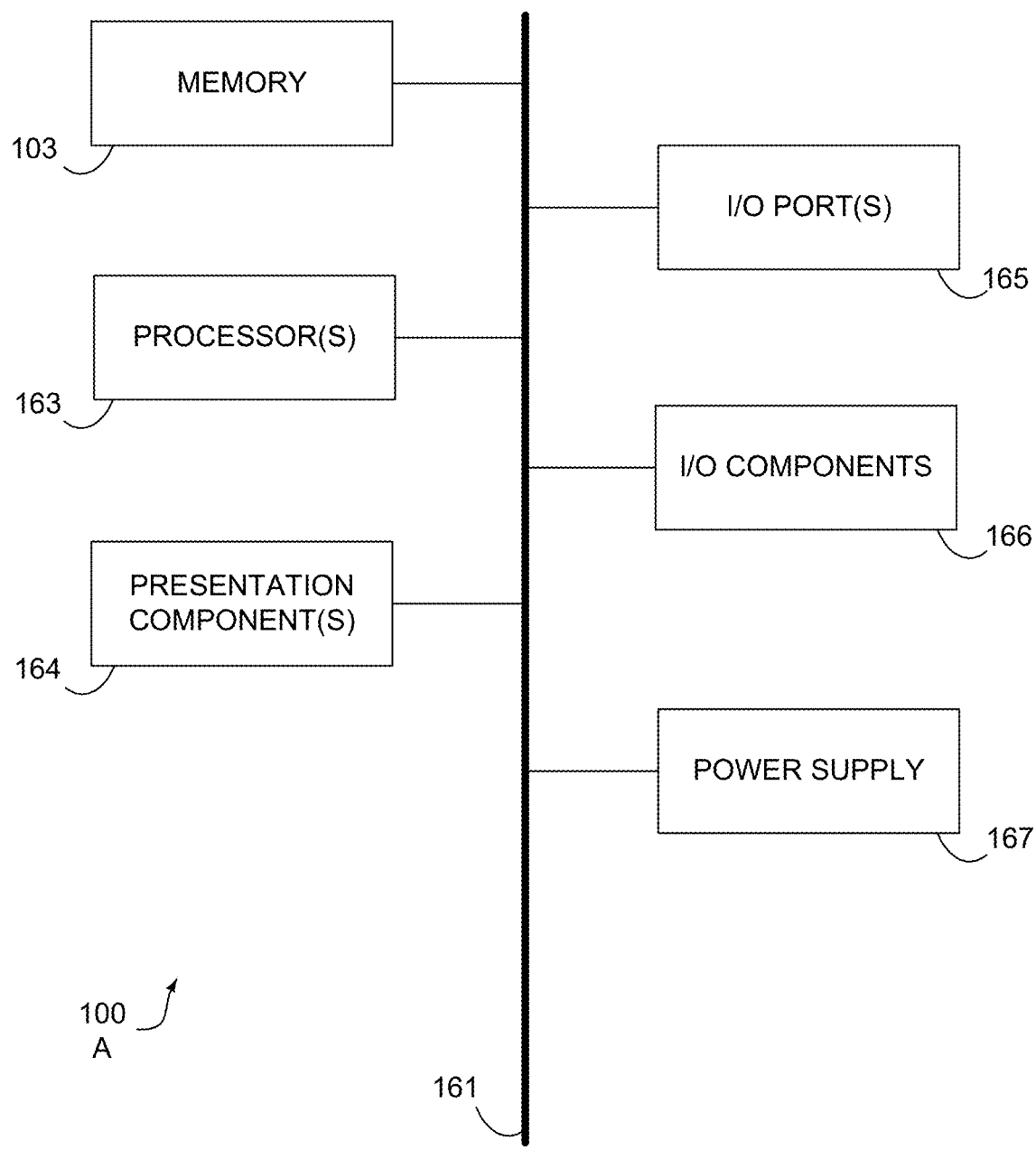
FIG. 1 illustrates an example of a computing environment for creating, deploying and managing a blockchain object, according to an embodiment of the present disclosure.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an embodiment of the present disclosure, an event interface system, hereinafter the system, facilitates generation, deployment, and management of a first blockchain object deployed on a first blockchain and a second blockchain object deployed on a second blockchain based on a context schema. The system is shown as system 100 in the figures and is further described below as the system 100. The system provides an interface between events that may affect the first blockchain object on the first blockchain, and the second blockchain object on the second blockchain. The events may be external to the first blockchain, the second blockchain or both. Additionally, the system can monitor a state of the first blockchain object and/or the second blockchain object. Based on the state of the first blockchain object and/or the second blockchain object, the system may control interactions directed to the first blockchain object, the second blockchain object or both. In an example, the interactions to the first blockchain object, the second blockchain object or both may be by way of messages addressed to the first blockchain object, the second blockchain object or both. The system also provides an interface between a blockchain object and an event that may affect the blockchain object on a cloud service. Also, the system facilitates the ability for the first blockchain object, second blockchain object or both deployed on the first blockchain and second blockchain respectively to request information and events from the system through a messaging mechanism.

A blockchain object may be a smart contract deployed on a blockchain. In an example, the smart contract may be called a smartlet. In another example, the blockchain object may be a cryptlet that may be executed in a secure enclave instead of on all peers on the peer-to-peer network mining the blockchain to arrive at a consensus on the next block of the blockchain. In an example, a cryptlet is an off-chain machine-readable instruction, that executes within a secure, trusted container and communicated with using secure channels to provide additional functionality or information to one or more blockchain objects. The context schema may describe the constraints on interactions of a blockchain object. The blockchain object may be of two types, one with code capable of being executed on a node of a peer-to-peer network mining the blockchain, and one without code.

Examples of constraints may include state, persona, role, action, and parameters of an action associated with the blockchain object and the like. In an example, a blockchain object may be a smartlet that regulates an interaction between two or more participants for a specified objective. A participant may be a participant of the blockchain with a specific objective with respect to a blockchain object on the blockchain. An example of a specific objective may be monitoring of the delivery of goods using Internet of Things (IoT) sensors, compliance with specifications of the goods and the like. The blockchain object may regulate an interaction with and to the blockchain object based on constraints defined in machine-readable instructions. The blockchain object may save an immutable record of the interaction on a new block on the blockchain.

The blockchain object may contain machine-readable instructions (e.g., code) that govern the interactions of the blockchain object. The blockchain object may save its current state on the blockchain. For example, the blockchain object may store its state in the blockchain object itself or outside the blockchain object. The interactions of the blockchain object may be restricted by the machine-readable instructions to serve a specific purpose. For example, the blockchain object may interact with its stored state or interact with other blockchain objects. The blockchain object may be deployed on the blockchain. The blockchain object deployed on the blockchain may be assigned a unique address. The unique address may be used to identify the blockchain object and to interact with the blockchain object.

The blockchain may receive events associated with the blockchain object from an event stack of the system in the form of messages addressed to the blockchain object's unique address. In an example, the system may deploy a message with an event associated with a first blockchain object on the blockchain. The system may deploy the message as a message blockchain object addressed to the first blockchain object at the first blockchain object's unique address in a new block of the blockchain. In an example, the second blockchain object may be a data object. A peer in a peer-to-peer network mining the blockchain to build a consensus may receive the message blockchain object and include the message blockchain object in the new block of the blockchain. In an example, the peer may execute machine-readable instructions on the first blockchain object in response to the message blockchain object addressed to the first blockchain object while evolving a consensus for the new block. The first blockchain object may store its change after execution, i.e., change its state or remain in the same state. The node may store the first blockchain object (which may have a changed state) along with the message blockchain object in a new block before mining the new block to arrive at a consensus. In an example, to prevent the blockchain object from being executed on all peers mining the blockchain, the blockchain object may be a cryptlet executed on the system in a secure enclave. The system may retrieve both the first blockchain object and the message blockchain object and execute the machine-readable instructions in a secure enclave and deploy the resulting blockchain object back to the blockchain.

The blockchain object may include machine-readable instructions that perform actions that are constrained. The machine-readable instructions may record the current state of the blockchain object, the person who deployed the blockchain object, the persons who may interact with the blockchain object and the like. In an example, the system may use the blockchain object machine-readable instructions and/or the current state stored in the blockchain to derive the context of the blockchain object.

The event stack of the system provides an interface between events and the blockchain object. For example, the event stack may deliver an event to the blockchain object using one or more services. Events may include external events to the system and internal events generated in the system. For example, an internal service may generate periodic events. An example of an external event may be a message from an IoT device received by the system. The event stack may queue events for processing by one or more system services. Examples of external events may include a weather report, a social media message, a message from an IoT device (e.g., measurements from IoT sensors), etc. In an example, a blockchain object may monitor the state of perishable goods that are on route from a factory to a retail location. The event stack may receive events, such as measurements changes from IoT sensors monitoring the temperature of the perishable goods, and then trigger a change in the state of the blockchain object. Examples of internal events may include an event generated by an internal service in the system. For example, a cryptlet in the system may generate an internal event periodically. In an example, the event may alter the state of the blockchain object. Also, the system may provide an interface for monitoring and managing the state of a blockchain object by monitoring the blockchain updates on the blockchain.

The event stack may allow the system to process events in real-time. The event stack may queue events as the events arrive. The system may treat inputs received from outside the system as events and use the event stack to allow one or more services to process the events. In an example, the system may also treat inputs and outputs of services as events that may be processed by other services. The system may include one or more services that retrieve and process the events. Thus, the system (e.g., services of the system) may access the queued events to retrieve and process the events. For example, the system may allow integration of an enterprise banking system that can perform operations such as money transfers and loan approval processing with a blockchain object without any changes to the enterprise banking system.

The system may utilize a context schema to provide context to the logic (e.g., machine-readable instructions) expressed in the blockchain object (e.g., smart contract) for example to generate an application programming interface. The application programming interface may be used to allow interaction with the blockchain object through a webpage, mobile page or a bot and the like. In an example, the system may generate a user interface that allows a participant to interact with a blockchain object based on a context schema. The context schema may describe the specifications of the blockchain object and constraints for interacting with the blockchain object. For example, a context schema may describe the current status of the blockchain object, the possible state transitions from the current state, the personas who may interact with the blockchain object, and the like. In an example, an instance of the context schema may be saved as a configuration file. Also, the configuration file may include details of the blockchain id the blockchain object is deployed on. For example, the blockchain object may be deployed on an Etherium blockchain. The blockchain id may be different for different blockchains or versions of the same blockchain. The configuration file may be specific to a blockchain object. The configuration file may be stored in the system and/or on the blockchain object.

The user interface generated by the system allows a participant, such as a user or a system, to interact with the blockchain object. For example, the system may generate different graphical user interfaces (GUIs) based on the current state of the blockchain object, the previous states of the blockchain object, future states, possible actions in the current state, possible actions based on the persona of the participant in the interaction, parameters of actions, and the like. The event stack receives events, such as participant interaction from the graphical user interface for processing by the services of the system. In an example, the system may store context schema values in a data repository (e.g., a database) in off-chain storage to store the contextual information. For example, the system may use the context schema to determine a persona type that is authorized to act on the blockchain object in its current state. For example, the persona type may be a user authorized to sell cars in a car dealership. In an example, the context schema may describe a hierarchy of blockchain object, state, action, persona, role, and other contextual data along with the history of the event. In an example, the user interface may be a web browser application to receive interaction from participants of the blockchain. The system may receive the interactions of the participants with the web browser application at the event stack in the form of events.

For example, the system may receive events (from the participants) via the user interface. Examples of events received from the user interface may include a user interaction with a blockchain object in accordance with its context schema, a request to retrieve state information of a blockchain object and parameters of the blockchain object, and instructions or parameters for deploying a blockchain object. For example, to deploy a blockchain object, the system may receive a blockchain identifier indicating where a blockchain object must be deployed from the user interface or may retrieve the blockchain identifier from off-chain storage as an internal event. In an example, a cryptlet may retrieve this information from the off-chain storage. The system may process the received events to determine the interaction between a participant and a blockchain object. In an example, the system may receive a parameter for the blockchain object based on a parameter specification in a context schema. The system may initialize the blockchain object with the received parameter. The system may deploy the initialized blockchain object to the blockchain. The system may also monitor a blockchain object on the blockchain, and store and provide information regarding updates to the blockchain object.

The system according to an example may allow authentication of participants using a simplified login with a username and password. The system may match the off-chain identity of the participant with the blockchain identity of the participant. For example, the blockchain identity of a participant may be a public key, private key pair stored in a key vault. The system may provide services such as a signing service that transparently integrates the off-chain identity of the participant with the blockchain identity of the participant. For example, the system may allow a participant to deploy the blockchain object to the blockchain by automating the signing procedure for blockchain objects before deploying the blockchain object using the appropriate private key pair and public key pair. For example, an organization may authorize only managers to authorize the sale of an asset such as a car. The system may abstract the deployment process for a blockchain object before deployment. For example, the system may present the manager with the details of the blockchain object such as the asset description, price of the asset, owner of the asset and the like in addition to an action list of actions for the manager, such as to approve deployment or disapprove deployment. The system may link the off-chain identity of the participant and retrieve the appropriate keys, initialize the blockchain object with the appropriate parameters, request for missing parameters, sign the blockchain object with the appropriate cryptographic signature and deploy the blockchain object.

Referring to the drawings in general, and initially to FIG. 1 in particular, an operating environment for the event interface system 100 (also referred to as the system 100). The operating environment for the system 100 is illustrated generally as computing device 101. Computing device 101 is but one example of a suitable operating environment and is not intended to suggest any limitation as to the scope of use or functionality of the disclosure. Neither should computing device 101 be interpreted as having any dependency or requirement relating to any one or combination of components illustrated. FIG. 3 below describes one example of the computing device 101. FIG. 3 includes components designed using the cloud architecture described in FIG. 2.

Components of the system 100 may be described and implemented in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Examples of the disclosure may be practiced in a variety of system configurations, including handheld devices, consumer electronics, general-purpose computers, specialty computing devices, etc. Aspects of the disclosure may also be practiced in distributed computing environments where tasks are performed by remote-processing devices that are linked through a communications network.

With continued reference to FIG. 1, computing device 101 includes a bus 161 that directly or indirectly couples the following devices: memory 103, one or more processors 163, one or more presentation components 164, input/output (I/O) ports 165, I/O components 166, and an illustrative power supply 167. Bus 161 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Recognizing that such is the nature of the art, the diagram of FIG. 1 is merely illustrative of an example of a computing device that can be used in connection with one or more examples of the present disclosure. Distinction is not made between such categories as "workstation," "server," "laptop," "handheld device," etc., as all are contemplated within the scope of FIG. 1 and reference to "computer" or "computing device."

Computing device 101 typically includes a variety of non-transitory computer readable media. By way of example, and not limitation, computer readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 101. Computer storage media does not, however, include propagated signals. Rather, computer storage media excludes propagated signals. Any such computer storage media may be part of computing device 101.

Memory 103 includes computer storage media in the form of volatile and/or nonvolatile memory. The memory may be removable, non-removable, or a combination thereof. Examples of hardware devices include solid-state memory, hard drives, optical-disc drives, etc. Processors 163 read data from various entities such as memory 103 or I/O components 166. Memory 103 stores, among other data, one or more applications. The applications, when executed by the one or more processors, operate to perform functionality on the computing device. The applications may communicate with counterpart applications or services such as web services accessible via a network (not shown). For example, the applications may represent downloaded client-side applications that correspond to server-side services executing in a cloud. In some examples, aspects of the disclosure may distribute an application across a computing system, with server-side services executing in a cloud based on input and/or interaction received at client-side instances of the application. In other examples, application instances may be configured to communicate with data sources and other computing resources in a cloud during runtime, such as communicating with a cluster manager or health manager during a monitored upgrade or may share and/or aggregate data between client-side services and cloud services.

Presentation component(s) 164 present data indications to a participant or other device. Examples of presentation components include a display device, speaker, printing component, vibrating component, etc. I/O ports 165 allow computing device 101 to be logically coupled to other devices including I/O components 166, some of which may be buser interfacelt in. Illustrative components include a microphone, joystick, game pad, satellite dish, scanner, printer, wireless device, etc.

Figure 2:
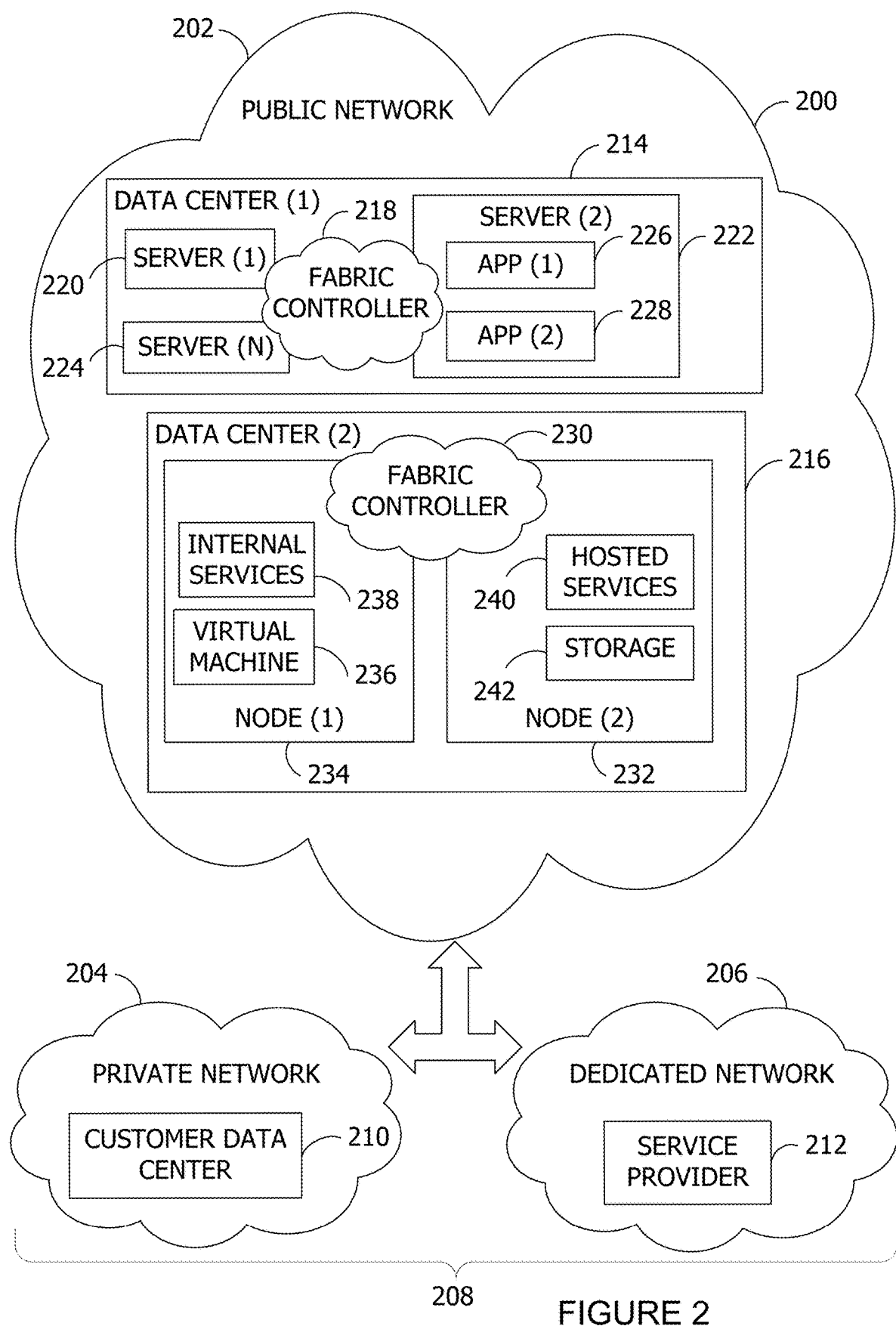
FIG. 2 shows an example of cloud system components that may be used to build an event interface system for blockchain objects, according to an embodiment of the present disclosure.
Figure 3:
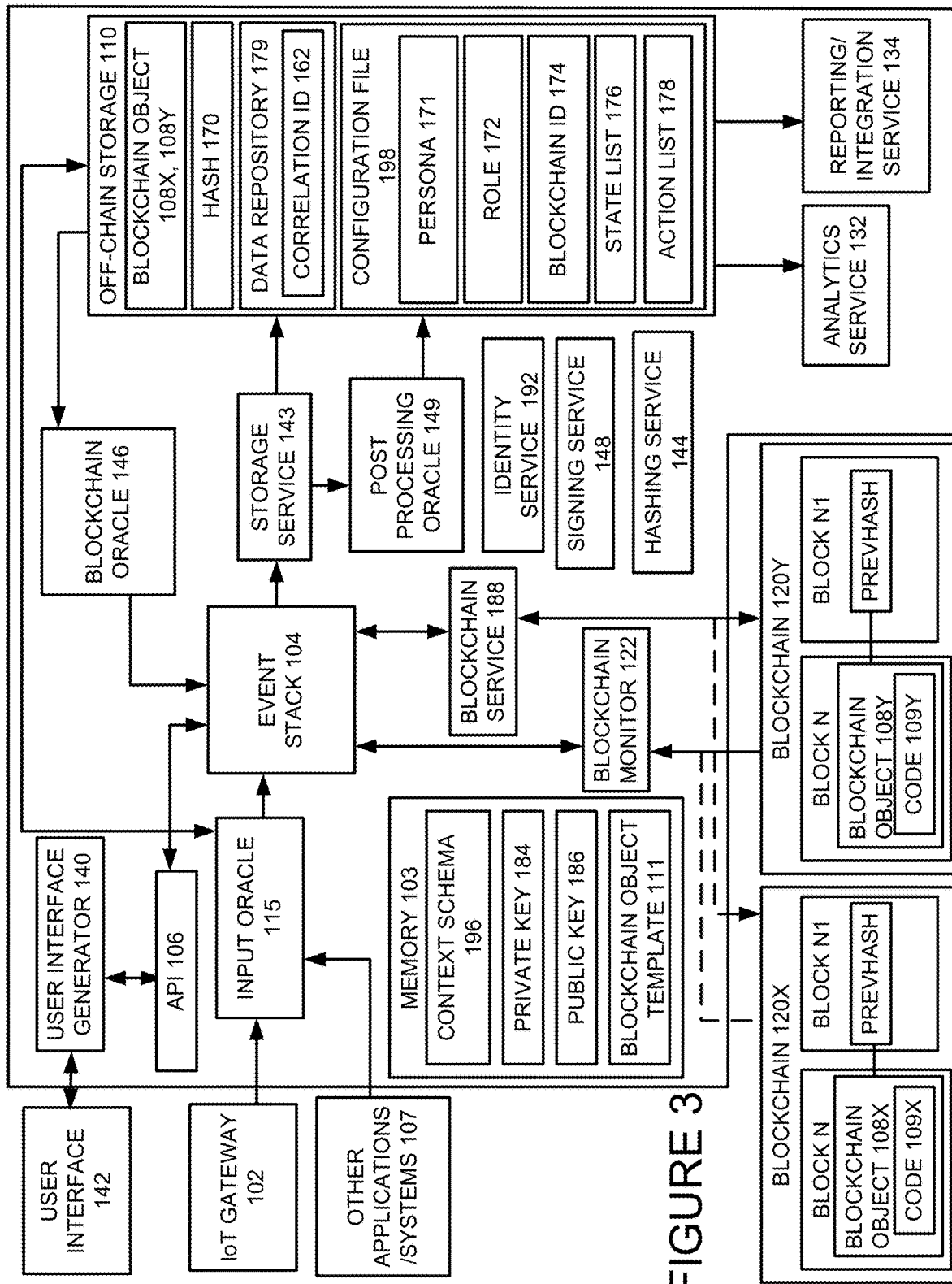
FIG. 3 illustrates a system diagram of an event interface system for creating, deploying and managing a blockchain object, according to an embodiment of the present disclosure.

FIG. 2 shows an example of an architecture 200 of a cloud computing environment for one or more components of the system 100 (described in detail in FIG. 3). The one or more components of the system 100 may use one or more components shown in FIG. 2 to create one or more services described in further detail in FIG. 3. The one or more services of the system 100 may generate a blockchain object, deploy a blockchain object, interface with a blockchain object and manage a blockchain object. Architecture 200 should not be interpreted as having any dependency or requirement related to any single component or combination of components illustrated therein. Also, any number of nodes, virtual machines, data centers, role instances, or combinations thereof may be employed to achieve the desired functionality within the scope of embodiments of the present disclosure.

The distributed computing environment of FIG. 2 includes a public network 202, a private network 204, and a dedicated network 206. Public network 202 may be a public cloud, for example. Private network 204 may be a private enterprise network or private cloud, while dedicated network 206 may be a third party network or dedicated cloud. In this example, private network 204 may host a customer data center 210, and dedicated network 206 may host an internet service provider 212. Hybrid cloud 208 may include any combination of public network 202, private network 204, and dedicated network 206. For example, dedicated network 206 may be optional, with hybrid cloud 208 comprised of public network 202 and private network 204.

Public network 202 may include data centers configured to host and support operations, including tasks of a generating, deploying, interfacing, and managing the blockchain object, according to embodiments of the current disclosure. It may be understood and appreciated that data center 214 and data center 216 shown in FIG. 2 an example of one implementation for accommodating one or more applications and is not intended to suggest any limitation as to the scope of use or functionality of embodiments of the present disclosure. Neither should data center 214 and data center 216 be interpreted as having any dependency or requester related to any single resource, combination of resources, combination of servers (e.g., server 220, server 222, and server 224) combination of nodes (e.g., nodes 232 and 234), or set of APIs to access the resources, servers, and/or nodes.

Data center 214 illustrates a data center comprising a plurality of servers, such as server 220, server 222, and server 224. A fabric controller 218 is responsible for automatically managing the servers and distributing tasks and other resources within the data center 214. By way of example, the fabric controller 218 may rely on a service model (e.g., designed by a customer that owns the modular-application) to provide an interface on how, where, and when to configure server 222 and how, where, and when to place application 226 and application 228 thereon. In one embodiment, one or more role instances of a modular-application may be placed on one or more of the servers of data center 214, where the one or more role instances may represent the portions of software, component programs, or instances of roles that participate in the blockchain object application manager application. In another embodiment, one or more of the role instances may represent stored data that is accessible to the blockchain object application manager.

Data center 216 illustrates a data center comprising a plurality of nodes, such as node 232 and node 234. One or more virtual machines may run on nodes of data center 216, such as virtual machine 236 of node 234 for example. Although FIG. 2 depicts a single virtual node on a single node of data center 216, any number of virtual nodes may be implemented on any number of nodes of the data center in accordance with illustrative embodiments of the disclosure. Generally, virtual machine 236 is allocated to role instances of a modular-application, or service application, based on demands (e.g., amount of processing load) placed on the modular-application. As used herein, the phrase "virtual machine" is not meant to be limiting, and may refer to any software, application, operating system, or program that is executed by a processing unit to underlie the functionality of the role instances allocated thereto. Further, the virtual machine 236 may include processing capacity, storage locations, and other assets within the data center 216 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 230 is responsible for automatically managing the virtual machines running on the nodes of the data center 216 and for placing the role instances and other resources (e.g., software components) within the data center 216. By way of example, the fabric controller 230 may rely on a service model (e.g., designed by a customer that owns the service application) to provide user interface on how, where, and when to configure the virtual machines, such as virtual machine 236, and how, where, and when to place the role instances thereon.

As discussed above, the virtual machines may be dynamically established and configured within one or more nodes of a data center. As illustrated herein, node 232 and node 234 may be any form of computing devices, such as, for example, a personal computer, a desktop computer, a laptop computer, a mobile device, a consumer electronic device, server(s), and the like. In one instance, the nodes host and support the operations of the virtual machines, while simultaneously hosting other virtual machines carved out for supporting other tenants of the data center 216, such as internal services 238 and hosted services 240. Often, the role instances may include endpoints of distinct service applications owned by different customers.

Typically, each of the nodes includes, or is linked to, some form of a computing unit (e.g., a central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer readable medium (e.g., computer storage media and communication media) accommodated by each of the nodes.

The role instances that reside on the nodes support the operation of service applications and may be interconnected via application programming interfaces (APIs). In one instance, one or more of these interconnections may be established via a network cloud, such as public network 202. The network cloud serves to interconnect resources, such as the role instances, which may be distributable placed across various physical hosts, such as nodes 232 and 234. Also, the network cloud facilitates communication over channels connecting the role instances of the service applications running in the data center 216. By way of example, the network cloud may include, without limitation, one or more local area networks (LANs) and/or wide area networks (WANs). Such networking environments are commonplace in offices, enterprise-wide computer networks, intranets, and the internet. Accordingly, the network is not further described herein.

With reference to FIG. 3, there is shown the system 100 that may create, deploy and manage a first blockchain object 108X on a first blockchain 120X and a second blockchain object 108Y on a second blockchain 102Y that are correlated using a correlation id 162, according to an embodiment. The first blockchain object 108X and the second blockchain object 108Y may be collectively called blockchain objects. Similarly, the first blockchain 120X and the second blockchain 120Y may be collectively called blockchains. The term blockchains 120X and/or 120Y, may refer to either of the blockchains or both. The term blockchain objects 108X and/or 108Y may refer to either of the blockchain of the blockchain objects or to both. For example, FIG. 3 shows the first blockchain object 108X and the second blockchain object 108Y that may be created by the system 100 and may be deployed on the first blockchain 120X and the second blockchain 120Y respectively by the system 100. In an example, the first blockchain object 108X, the second blockchain object 108Y or both may be smartlets. As is further discussed below, the system 100 may also serve as an interface between an event, which may be received and queued for processing in an event stack 104, and the first blockchain object 108X, the second blockchain object 108Y or both. The system 100 may also facilitate and control interactions with the first blockchain object 108X, the second blockchain object 108Y or both by a participant or another system attempting to interact with the blockchain object 108. For example, the blockchain object 108X may be accessible only to a participant with a persona of a buyer, while the blockchain object 108Y may be accessible to a participant with a persona of a seller. The system 100 may use the correlation id 162 to synchronize the blockchain object 108X on the first blockchain 120X and the blockchain object 108Y on the second blockchain 120Y. Also, the system 100 allows services, which may be incorporated in the system 100, to process events and other information pertaining to the blockchain objects 108X and 108Y. A service may refer to a software functionality or a set of software functionalities that different systems or users or other software functionalities can reuse and may include policies that control its usage. It should be understood that the system 100 may include additional components other than shown and that one or more of the components described herein may be removed and/or modified without departing from a scope of the system 100.

The event stack 104 queues one or more events. For example, the event stack 104 may be a service on a cloud platform using some or all of the components described in FIG. 2 to receive data from multiple sources and queue the data for other services in the system 100 to further process. In an example, the event stack 104 may receive large streams of data and include a scalable data streaming platform and event ingestion service capable of receiving and processing millions of events per second. Examples of these type of events received at the event stack 104 may include data from IoT sensors received via an IoT gateway 102 or data from real-time social media feeds. Other types of events may include user interactions received via user interface 142, events received from other applications systems 107, events received from blockchains 120X, 120Y, and events received from an off-chain storage 110. The event stack 104 may receive feeds from various sources. For example, the event stack 104 may receive a Twitter™ firehose feed of all Twitter™ notifications. In an example, the event stack 104 stores events in the order in which the events were received to allow one or more services, blockchain oracles or cryptlets, which are further described below, to process the events. The event stack 104 may receive events through a network.

In the system 100, cryptlets or oracles may be used to enable the processing of events on the event stack or for processing data generally on the system 100 or for processing events received from the blockchain and any source of events internal to the system 100 or external to the system 100. Cryptlets and oracles may include machine-readable instructions that may be executed on the blockchain or in secure enclaves outside the blockchain. The cryptlets and oracles may execute their machine-readable instruction in a secure enclave where the data is protected during execution of the code. In an example, components 115, 146 and 149 of the system 100 may be embodied as a cryptlet or an oracle. The system 100, may use cryptlets or oracles to perform the services provided by the input service 115, blockchain oracle 146 and the post processing service 149 or other services.

The system 100 may include an input service 115 to receive events, such as real-time events, messages from an IoT gateway 152, and events from other applications or systems 107. In an example, the input service 115 may process events received from external sources before sending the events to the event stack 104. In an example, the input service 115 may deploy the received events as messages addressed to a blockchain object on blockchains 120X and/or 120Y. In an example, the message may be a message blockchain object addressed to the first blockchain object 108X on the first blockchain 120X. For example, assume the first blockchain object 108X and the second blockchain object 108Y includes machine-readable instructions that govern asset transfer. Also, assume a participant with the persona of a buyer interacts with the blockchain object 108X and another participant with the persona of a seller interacts with the blockchain object 108Y. The system 100 may receive a message addressed to the second blockchain object 108Y on the second blockchain 120Y with an offer. The system 100 may then synchronize the message to the first blockchain object 108X by deploying a message blockchain object addressed to the first blockchain object 108X on the first blockchain 120X with the offer.

The event stack 104 may also interface with an Application Programming Interface (API) 106 that invokes generating a user interface 142 through a user interface generator 140. The user interface generator 140 may generate the user interface 142 to receive interactions from a participant. The system 100 may treat the interaction received from the participant as an event. In an example, the user interface 142 may be generated on a remote computer. The user interface 142 may be displayed on a screen in a web browser. The user interface generator 140 may queue events received from participants via the user interface 142 in the event stack 104 through the API 106.

Also, the input service 115 may receive an event from other systems. For example, the input service 115 may receive an event from other application systems 107. The input service 115 may also retrieve events from off-chain storage 110 and other services, as is further discussed below.

In an example, the API 106 may allow the system 100 to receive events at the event stack 104 from the user interface 142. The events may in examples identify a participant (e.g., a participant), provide authorization to interact with a blockchain object, identify a list of currently associated blockchain objects, generate new blockchain objects, provide documents for hashing, uploading to a blockchain, provide documents for storage on the off-chain storage 110, details of a blockchain object such as owner, the participants allowed to interact, offer price, etc. Although the user interaction is described with reference to the user interface 142, the system 100 may receive events from a participant through the command line, a holographic interface, a voice recognition system, from other systems 107 and the like.

In an example, the input service 115 in association with the API 106 may provide an interface to websites, mobile devices, and other systems to allow access to blockchains 120X, 120Y and/or blockchain objects 108X, 108Y. The system 100 may thus provide a service that may allow interaction between the blockchain and participants using the API. For example, a mobile application may use the API to allow participants access to blockchains 120X, 102Y.

Examples of services that may process the events queued by the event stack 104 may include a storage service 143, a blockchain service 188, a blockchain monitor 122, an analytics service 132, an integration service 134, etc., which are further discussed below. Also, the system 100 may process events, and determine whether to alter the state of blockchain object 108X and/or 108Y based on the events, as is further discussed below.

The storage service 143 may store the events in off-chain storage 110. Off-chain storage 110 refers to storage outside the blockchain 120X, 120Y. Examples of the off-chain storage 110 include databases, cloud storage services, data lakes, and the like. In an example, the system 100 may store events locally on a hard drive, and the storage service 143 may process the events before storing the events in the off-chain storage 110. In an example, the system 100 may use a post processing service 149 to process events before storing the events in the off-chain storage 110.

The storage service 143 may maintain a synchronized version of events on the blockchain 120X, 120Y in the off-chain storage 110. For example, the storage service 143 may generate a hash of a new event that occurs on the first blockchain 120X or the second blockchain 102Y and store the event and the hash in the off-chain storage 110. Also, the system 100 may deploy a message blockchain object to the other blockchain with the new event addressed to the blockchain object on the other blockchain to synchronize the events on the two blockchains. The storage service 143 may generate a hash of each blockchain object on blockchains 120X,120Y when new objects are added to blockchains 120X, 120Y. The hashing service 144 may hash the blockchain object (i.e., event received from blockchains 120X and/or 120Y) from the event stack 104 before storing the hash and the transaction to the off-chain storage 110. The hashing service 144 may use an SHA (Secure Hashing Algorithm) or any suitable cryptographic function to generate a hash of an input, such as an event. Also, the hashing service 144 may be used to hash an event, such as a blockchain object deployed on blockchains 120X and/or 120Y. For example, when the first blockchain object 108X is deployed on the first blockchain 120X, the first blockchain object 108X is hashed using the hashing service 144, to determine a hash 170 of the blockchain object 108X. The storage service 143 may store the first blockchain object 108X and the hash 170 in the off-chain storage 110. Hashes may be used to identify blockchain objects stored in the off-chain storage 110. Hashes may also be used to verify whether the blockchain objects stored in the off-chain storage 110 are the same as those on the blockchain 120X and/or 120Y. For example, the system 100 may compare the hashes of the same blockchain object stored on the first blockchain 120X and the off-chain storage 110 to verify that the two objects are identical and has not been tampered with. In an example, the system 100 may store the hash 170 of the first blockchain object 108X to the blockchain 120X instead of deploying the first blockchain object 108X. The storage service 143 stores the hash 170 and the first blockchain object 108X in the off-chain storage 110. Storing the hash of the first blockchain object 108X instead of the first blockchain object 108X itself on the first blockchain 120X may allow the system 100 to execute the first blockchain object 108X in a secure enclave in response to events on the first blockchain 120X and/or on the second blockchain 120Y and deploy the new hash (e.g., the first blockchain object 108X may have a changed state after execution) of the first blockchain object 108X after execution on the first blockchain 120X. Although described with reference to the first blockchain object 108X and the first blockchain 120X, the storage service 143 may perform similar operations on the second blockchain object 108Y deployed on the second blockchain 120Y In an example, the storage service 143 may store information on the off-chain storage 110 that may not be placed on blockchains 120X and/or 120Y due to the immutability of blockchains 120X and/or 120Y. For example, the personally identifiable information may be stored in the off-chain storage 110.

The event stack 104 may also receive an event (e.g., a blockchain object on a blockchain) from the blockchain monitor 122. For example, the blockchain monitor 122 monitors block updates, i.e., blocks as they are added to blockchains 120X and/or 120Y. A block update may be a new block. The blocks may include files containing blockchain objects. The blockchain monitor 122 may retrieve a new block after it is posted to the first blockchain 120X, identify a plurality of events in a block update (i.e., a new block) in the first blockchain 120X, and queue the plurality of events on the event stack 104 for processing. In an example, the blockchain monitor 122 may monitor the first blockchain 120X generated on a peer-to-peer network of nodes mining the first blockchain 120X to generate a consensus on the new block with blockchain objects external to the system 100. The blockchain monitor 122 may receive a new block on the first blockchain 120X published by a node of the peer-to-peer network external to the system 100. The peer may publish the new block after the node generates the new block based on a consensus protocol of the first blockchain 120X. Examples of consensus protocols for the first blockchain 120X may include proof of work, proof of stake, gossip about gossip, directed acyclic graph or the like. The blockchain monitor 122 may identify blockchain objects on the new block. In an example, the blockchain monitor 122 may generate an event for each blockchain object on the new block. Events may be queued on the event stack 104 from the blockchain monitor 122. The events may also be stored in the off-chain storage 110 by the storage service 143 as described above.

In an example, the blockchain monitor 122 may receive a block update with a change in state for the first blockchain object 108X. The blockchain monitor 122 may place the event with the change in state of the first blockchain object 108X on the event stack 104. In another example, the blockchain object 108X may depend on the system 100 to change its state (e.g., the blockchain object 108X may not be executed/supported on the blockchain 120X). The blockchain monitor 122 may receive a block update with a message blockchain object addressed to the first blockchain object 108X. The blockchain monitor 122 may place the message event on the event stack 104 for other services in the system 100.

Although described with reference to the first blockchain object 108X and/or the first blockchain 120X, the blockchain monitor 122 may provide similar functionality to other blockchain objects and/or blockchains The event stack 104 may also interface with a blockchain service 188 that writes events to the first blockchain 120X. The blockchain service 188 may allow the system 100 to deploy selected events from the event stack 104 to the first blockchain 120X. For example, the system 100 may receive an event (e.g., an interaction from a participant) through the user interface 142 to deploy the first blockchain object 108X. The blockchain service 188 may then transmit the first blockchain object 108X to a node on a peer-to-peer network of nodes mining the first blockchain 120X. The node may then generate a new block for the first blockchain 120X based on the consensus protocol of the first blockchain 120X. As described above, the storage service 143 may also store the first blockchain object 108X in the off-chain storage 110. The storage service 143 may also store hash 170 of the first blockchain object 108X in the off-chain storage 110.

In an example, the blockchain service 188 may deploy the first blockchain object 108X to the first blockchain 120X. Although described with reference to the first blockchain object 108X and/or the first blockchain 120X, the blockchain service 188 may provide similar functionality to other blockchain objects and/or blockchains. For example, the blockchain service 188 may deploy the second blockchain object 108Y to the second blockchain 120Y.

In another example, the blockchain service 188 may be blockchain agnostic. For example, the blockchain service 188 may deploy blockchain objects 108X and/or 108Y to two or more blockchains 120X and/or 120Y. As used herein 108X and/or 108Y means the first blockchain object 108X and/or the second blockchain object 108Y.

The storage of events on off-chain storage 110 allows analytics services 132 and reporting and integration service 134 to use the data without additional steps to obtain blockchain object data from the first blockchain 120X, the second blockchain 120Y and/or both. Examples of the analytics service 132 may include Azure™ Data Lake analytics, Azure™ Stream Analytics, machine learning analytics and the like. Also, the off-chain storage 110 augments the first blockchain object 108X with contextual information about the first blockchain object 108X not available on the first blockchain 120X. The contextual detail is available to services on the system 100 including services that are blockchain agnostic using the configuration file 198, which describes relationships between users, their roles, actions available to them, parameters of the blockchain object and the like. The reporting/integration service 134 may allow integration of the blockchain objects stored in the off-chain storage 110, the contextual details augmented by the configuration file 198 and a data repository 179 storing the values of the contextual information in accordance with the type information in the configuration file 198 with services that are not blockchain aware. The services that are not blockchain aware may access the events from the first blockchain 120X, the second blockchain 120Y or both from the data repository 179 storing all the values along with contextual information.

As discussed above, the system 100 may use the blockchain service 188 to sign the first blockchain object 108X before deploying to the first blockchain 120X. The system 100 may use the identity service 192 to determine the signing key for a participant and the signing service 148 to cryptographically sign the first blockchain object 108X with the determined signing key before deploying the first blockchain object 108X to the blockchain 120X. The cryptographic signature of the first blockchain object 108X may be the signature of the first blockchain object 108X generated using the private key 184 of a participant. Each object on the first blockchain 120X may be cryptographically signed using the private key of one or more participants that create or interact with the first blockchain object 108X. In an example, a participant may generate an event (e.g., a message addressed to the first blockchain object 108X) and deploy the event to the first blockchain 120X to interact with the first blockchain object 108X. The first blockchain object 108X may receive the event and execute the blockchain object's machine-readable instructions (e.g., code 109X) on a peer of a peer-to-peer network mining the first blockchain 120X. The first blockchain object 108X may then change its state based on the interaction. In an example, the first blockchain object 108X may store its current state as a final step of each execution. The peer on the peer-to-peer network may publish the first blockchain object with the new state on a new block of the first blockchain 120X. If needed, the cryptographic signature of the participant who deployed the first blockchain object 108X may be retrieved from a previous block of the first blockchain 120X. The cryptographic signature of the message may be detected from the message by examining the signature on the message and identifying the public key using the asymmetric property of cryptographic signatures. In an example, the system 100 may access a public database holding the public keys, associated names and email address of the participant to retrieve the off-chain identity based on the blockchain identity.

The system 100 may trigger a change to the first blockchain object 108X by sending a message addressed to the first blockchain 120X through the blockchain service 188. The message may be a message blockchain object deployed to the first blockchain 120X. The signing service 148 may sign the message using cryptographic keys of a participant (e.g., a buyer of an asset or a seller of an asset in a blockchain for selling an asset). For example, the system 100 may detect a change in state of the second blockchain object 108Y on the second blockchain 120Y that is correlated with the first blockchain object 108X through the correlation id 162. The system 100 may then trigger a change to the first blockchain 120X

For example, the system 100 stores, in memory 103, a private key 184 and a public key 186 of a particular participant interacting with the system 100. In an example, the message blockchain object may be signed using the private key 184 of the participant. Thus, the system 100 can authenticate message blockchain object using the cryptographic function. Memory 103 is shown by way of example as a storage device that may store information for the system 100, including cryptographic keys and other information, but other types of storage may be used as well.

The input service 115 may process an event and place the event on the event stack 104 for deployment to the first blockchain 120X through the blockchain service 188. In an example, the system 100 may use the hashing service 144, the signing service 148 or both to securely encrypt the confirmation message with the public key 186 of the participant to confirm receipt of consideration.

The system 100 may use the signing service 148 to sign a the first blockchain object 108X, for example, using the private key 184 and the public key 186 from the memory 103. The system 100 may also generate a hash of the first blockchain object 108X and store the hash on the off-chain storage 110. The system 100 may then deploy the blockchain object through the blockchain service 188.

Although described with reference to the first blockchain object 108X and/or the first blockchain 120X, the blockchain service 188 may provide similar functionality to other blockchain objects and/or blockchains.

In an example, for asset transfer, a seller, a buyer, a banker, an inspector and an appraiser may be entities that are part of a consortium. The entities may have employees who perform various roles in the asset transfer. For example, a participant (e.g., a manager working for a seller) may be authorized to sell the real estate property. The system 100 may use the signing service 148 to authenticate an offer for sale on the first blockchain 120X.

In an example, the banker, the inspector and the appraiser may be part of a private consortium blockchain. The system 100 may use a hashing service 144 to generate a hash of the blockchain object (e.g., a transaction) posted on the private consortium blockchain. The system 100 may then deploy the hash of the first blockchain object 102X to the second blockchain 120Y. The hash of the first blockchain object 108X deployed on the second blockchain 120Y may allow the users to determine whether the state of the blockchain object 108X has changed on the blockchain 120X without accessing the blockchain 120X. For example, assume the first blockchain object 108X and the correlated object 108Y are deployed on the first blockchain 120X and the second blockchain 120Y respectively. The system 100 may deploy the hash of the first blockchain object 108X on the second blockchain 120Y. The blockchain monitor 122 may then monitor the updates to the state of the first blockchain object 108X on the first blockchain 120X. When the state of the first blockchain object 108X changes, the blockchain monitor 122 may post the new hash of the blockchain object 108X addressed to the second blockchain object 108Y on the second blockchain 120Y.

Thus, the system 100 may allow blind transactions on private, semi-private blockchains. Also, the system 100 may act as an interface between blockchain objects on two different blockchains.

The identity service 192 may reduce the complexity of interacting with the first blockchain 120X for a participant using the system 100 by associating an off-chain identify of the participant with a blockchain identity of the participant. In an example, the off-chain identity of the participant may be the first name and last name of the participant, the job title, the role, the organization unit, email address, phone number and the like of the participant in an organization. In another example, the participant may be a private individual identified by his role, email address, phone number and the like. The blockchain identity of the participant may be the private key 184 and the public key 186 of the participant. The identity service 192 may store the off-chain identity and the off-chain identity of the participant in the off-chain storage 110. In an example, the identity service 192 may generate metadata information in the off-chain storage 110 that maps the off-chain identity of the participant with the on-chain identity of the participant for the blockchain object 108. For example, the configuration file 198 may include definitions of the different roles within a specific context in the blockchain object 108. The identity service 192 may use the role information in the configuration file 198 for blockchain objects 108X and/or 108Y and the context such as when the role is enabled for blockchain objects 108X and/or 108Y to map the public identity and the private identity of the participant in the off-chain storage 110. In an example, the identity service 192 may store the mapping in the data repository 179 in the off-chain storage 110.

For example, assume a first participant works for a company selling a car and a second participant works for a company selling a loan for the purchase of the car. The company selling the car and the company selling the loan may be part of a consortium that uses the system 100 and the first blockchain 120X. The first participant and the second participant may be invited to join the consortium using their existing credentials. For example, the existing credentials may be their email address issued by the entity they represent. In an example, the system 100 may allow the first participant and the second participant to login using the credentials such as email address of the entity they represent. The system 100 may enforce authentication policies of the entity selling the cars on the first participant. Also, the system 100 may enforce the authentication policies of the entity selling the loans on the second participant. For example, an authentication policy of the company may require a participant to use two-factor authentication.

In an example, the participant may log into the system 100 with an email address, which may be the participant's username. In an example, the system 100 may use a protocol such as the OAuth to authenticate the participant and receive a token that may be used to authenticate the participant a session. For example, the protocol may authenticate the participant using the Azure Active Directory service associated with the company of the participant. For example, for the first participant, the system 100 may use the Azure Active Directory service of the first participant to authenticate the participant and to determine a token to authenticate the participant during the session.

In an example, during the first interaction with the system 100, the system 100 may generate a blockchain identity of the participant such as the private key 184 and the public key 186. In an example, the blockchain identity of the participant may be an address on the first blockchain 120X (e.g., Etherium blockchain). The system 100 may allow the participant to interact with the first blockchain 120X using the token. The token may allow the system 100 to map the participant's off-chain identity to the blockchain identity of the participant using the metadata stored in the data repository 179.

Also, the system 100 may assign roles to the participant to allow access to the first blockchain object 108X. For example, a manager in a company selling cars may be identified as the owner of the cars for sale. The system 100 may allow the owner to deploy the first blockchain object 108X to sell cars, deactivate the listing on the blockchain 120X and the like based on the identity.

In an example, the identity service 192 may query the data repository 179 to determine contextual details of the participant, such as the participant's first name and last name, role 172 in the organization, persona 171 in the blockchain objects associated with the participant, and events associated with the participant. In an example, the system 100 may store the information in the data repository 179 using the configuration file 198. The metadata in the data repository 179 may allow the system 100 to identify the appropriate fields to populate, to index the contextual information for easy retrieval, and to provide a data repository that may be used by other services to seamlessly access the information on the first blockchain 120X and associated objects. The contextual information in the data repository 179 may include information about the participant that may identify the participant to the system 100 and other participant interacting with the participant. For example, the contextual information about the participants may allow the system 100 to display the first and last name of one or more participants that interacted with the first blockchain object 108X when details of the first blockchain object 108X is presented on the user interface 142. For example, the participant (e.g., seller) may be shown the first and last name, and an option to contact the buyer, appraiser and/or inspector based on the contextual information.

In an example, the system 100 may allow the use of the off-chain identity to compartmentalize access to the information. For example, the system 100 may allow the participant to access the blockchain objects based on the role of the participant stored in the metadata on the data repository 179. In another example, the system 100 may restrict access to the participant based on the state of the blockchain object 108X and/or 108Y. For example, assume the appraiser may access blockchain object 108X and/or 108Y only after acceptance. The system 100 may enforce these access controls based on the metadata in the data repository 179 mapping the participant's roles to the participant's blockchain identity. For example, in the Etherium blockchain, blockchain object 108X and/or 108Y may be a smart contract. The smart contract may have restrictions on who may interact with the object based on the status of the smart contract. For example, the first blockchain object 108X (e.g., the smart contract on Etherium) may allow interaction with only inspectors in one of the states. The system 100 may use the mapping in the data repository 179 to identify the participant, obtain contextual information about the role of the participant and allow the participant to interact only when the role of the participant matches the restrictions imposed by the blockchain object on the role of the participant. For example, in a smart contract written in Solidity language and targeted for the Ethereum blockchain, code generation could deliver Modifier functions that implemented role-based access control to certain functions within the contract.

In an example, the system 100 may receive contextual details of the participant through the user interface 142. Also, the identity service 192 may also link the off-chain identity and the blockchain identity of the participant by storing these details in the data repository 179. For example, the identity service 192 may map the participant's off-chain identity with the blockchain identity on the data repository 179. In an example, identity service 192 may store the metadata such as the mapping of the off-chain identity and the on-chain identity to the participant's blockchain identity such as the participant's private key 184 and public key 186. In an example, the participant's off-chain identity may be a user-specific ID that is associated with one or more external ids. For example, an id that maps to the Azure Active Directory, a mac address for a device, an active directory service on a machine or the like. Based on the stored metadata, the system 100 can determine when the off-chain identity and the blockchain identity of the participant match by retrieving the mapping information from the metadata store and verifying the information in order to facilitate interactions with a deployed blockchain object. Also, the identity service 192 may use the metadata in the data repository 179 linking the real-world identity and the blockchain identity (e.g., in the data repository 179 with the two fields) to remove the participant from the system 100 and revoke access to the first blockchain 120X. For example, the system 100 may remove a participant who is no longer authorized to interact with the first blockchain 120X on behalf of the company in a consortium.

The signing service 148 may use the private key 184 of the participant to sign the first blockchain object 108X, and the blockchain service 188 deploys the signed first blockchain object 108X on the first blockchain 120X. The identity service 192 or another component of the system 100 may determine whether the participant with a particular off-chain identity is authorized to deploy the blockchain object 108. For example, the system 100 may use context schema 196 to determine persona 171 of the participant, and the system 100 may determine whether the participant is allowed to deploy a blockchain object based on the persona 171 and/or role 172 of the participant.

In an example, the system 100 may use the identity service 192 to authenticate the identity of a participant on the first blockchain 120X. For example, after the first blockchain object 108X is deployed on the first blockchain 120X, the system 100 may receive an event from the first blockchain object 108X that requests verification of the identity of a participant. The system 100 may receive the event from the first blockchain object 108X through the blockchain monitor 122. The event includes the cryptographic signature of a participant associated with the event, which may be provided in a message blockchain object addressed to the first blockchain object 108X and/or 108Y from the participant. The system 100 may use the cryptographic signature of the participant from the event to identify the off-chain identity of the participant. For example, the system 100 may use a username and password for the participant to authenticate the participant and associate the participant's blockchain identity with the participant's off-chain identity. The system 100 may support other authentication schemes over the network such as oAuth protocol and the like.

Although described with reference to the first blockchain object 108X and/or the first blockchain 120X, the identity service 192 may provide similar functionality to other blockchain objects and/or blockchains.

The memory 103 may store the context schema 196, the private key 184, the public key 186 and blockchain object template 111. In an example, the context schema 196 may include a parameter specification of the blockchain object 108. The parameter specification may include parameters or variables that describe who may interact with the blockchain object, when they may interact, how they may interact, what are the parameters of the interaction, the purpose of the interaction and the like. The parameters may include acceptable types for the information. The context schema 196 may describe a hierarchy of a blockchain object, state, action, persona, role, and other contextual details. The system 100 may create an instance of the context schema 196, i.e., configuration file 198. For example, the configuration file 198 as shown inherits the hierarchy of the state list 176 containing the actions from the action list 178 in each state of the state list 176 and the actions from the action list 178 including the personas 171 who may perform the action and the parameters 175 of the actions. For example, the system 100 can populate the data repository 179 with values of the parameters, states, actions, personas, etc., described in the configuration file 198. In an example, the system 100 may generate a customized instance of the context schema 196 and store this instance as the configuration file 198 that may include customizations such as the parameters specifications, action specifications, state lists, action lists, personas who may interact and the like for a blockchain object. In an example, the system 100 may store the configuration file 198 for the blockchain object, the blockchain object and a hash 170 of blockchain objects 108X and/or 108Y in the off-chain storage 110. The difference between the context schema 196 and the configuration file 198 may be the customized parameters and the types specific to a particular blockchain object. The system may store the values of parameters in the configuration file 198 in the off-chain storage (e.g., in the data repository 179).

The configuration file 198 may be used to create the blockchain object 108. Values of one or more of the parameters in the configuration file 198 may be received via the user interface 142 to create the first blockchain object 108X. The values received may be stored in the data repository 179 using the contextual information such as type information in the configuration file 198. In an example, the user interface 142 may also be used to receive values and/or constraints for interacting with the first blockchain object 108X, and the constraints may be stored in the configuration file 198, and the values may be stored in the data repository 179.

In an example, the system 100 may use the configuration file 198 to determine the blockchain id 174 of the blockchain. The blockchain id 174 may identify the blockchain the first blockchain object 108X is to be deployed on such as the first blockchain 120X, the second blockchain 120Y or both. The system 100 may then use the configuration file 198 to generate the first blockchain object 108X based on the specifications of the blockchain object for the blockchain identified by the blockchain id 174. For example, the first blockchain object 108X may be deployed on the Etherium blockchain. The system 100 may then generate the first blockchain object 108X that complies with the specification for blockchain objects for the Etherium blockchain.

In another example, the system 100 may deploy a correlated set of blockchain objects on two or more blockchains. In order to deploy the correlated set of blockchain objects on two or more blockchains, the system 100 may determine the specifications for blockchain objects on the different blockchains. For example, assume the first blockchain object 108X is deployed on the first blockchain 120X and the correlated second blockchain object 108Y is deployed on the second blockchain 120Y. The system 100 may use the configuration file 198 to determine the blockchain id of the first blockchain 120X and the second blockchain 120Y. In an example, different participants may use different blockchains. The system 100 may then generate a blockchain object 108X based on the specification for the blockchain 120X. Similarly, the system 100 may then generate a blockchain object 108Y based on the specification for the blockchain 120Y. The blockchain object 108X and the blockchain object 108Y may include functionally similar machine-readable instructions (code 109X, 109Y) that are compatible with their respective blockchains 120X and 120Y. Also, the system 100 may generate a correlation id 162 to link the first blockchain object 108X and the second blockchain object 108Y in the data repository 179.

For example, assume the first blockchain 120X is Etherium™ and the programming language is Solidity™ and the second blockchain 120B is Neo™, and the programming language is Java™. The system 100 may determine the specifications for blockchain objects on the first blockchain 120X and second blockchain 120Y. Then the system 100 may generate the first blockchain object 108X with the logic governing the interactions between one or more participants in Solidity™ and generate the second blockchain object 108Y with the logic governing interactions between one or more participants in Java™. Thus system 100 may then generate a correlation id.

The system 100 may deploy the correlated set of blockchain object (e.g., smart contract) on two or more blockchains.

The system 100 may use the contextual details of the participant, to generate the appropriate user interface for the participant. For example, to create the blockchain object for deployment the system 100 may use the configuration file 198 to determine the parameters of the initial state of the first blockchain object 108X, and the actions available in the initial state, and the parameters associated with the actions in the initial state for the first blockchain object 108X. For example, the initial state of the first blockchain object 108X may be part of the state list 176, the actions available to the participant may be available in the action list 178 and the parameters for the action may also be available in the configuration file 198. Also, the off-chain storage 110 may include the data repository 179 with contextual information about the participant. The system 100 may thus display the user interface 142 with all contextual information of the blockchain object in the initial state that may facilitate the participant's decision making. The information displayed may be based on the contextual information about the initial state such as the information already available about the blockchain object, default information for some types of parameters of the blockchain object (e.g., a description of a car and model assuming the blockchain object is for sale of a car). The user interface 142 may also generate user interface elements such as buttons and entry fields based on the type of the parameter requested. For example, a yes or no decision or a decision with a fixed set of choices may be presented as a button or a drop-down list with the appropriate label from the configuration file 198. A request for a numeric quantity (e.g., a type integer) or name or description (e.g., a type string) may be presented using an input text box.

Although described with reference to the first blockchain object 108X and/or the first blockchain 120X, the configuration file 198 may provide similar functionality to other blockchain objects and/or blockchains.

Blockchain object templates, such as blockchain object template 111 in association with the context schema 196 or the configuration file 198, may be used to create blockchain objects. The blockchain object template 111 may include the machine-readable instructions for the blockchain object (e.g., code 109 for blockchain objects 108X and/or 108Y). For example, the blockchain object template 111 may be associated with a configuration file 198. The configuration file 198 may describe the states of the blockchain object, the actions of the participants in each state, the persona of the participant who may interact with the blockchain object in each state and the role of the participant and the like. For example, the state list 176 may provide a series of states or a state map and the next states from a particular state. The actions of the participant who initiates the blockchain object in the initial state may be retrieved from the actions list 178. The parameters of the action and the types of these parameters may also be obtained from the configuration file 198. This information may be described as the contextual information of the blockchain object. Also, the system 100 may include contextual information about the participant in the data repository 179.

The user interface generator 140 may generate the user interface 142 using the contextual information from the configuration file. The user interface generator 140 may display the user interface 142, and a participant may enter values for parameters as specified in the configuration file 198 associated with the blockchain object template 111 via the user interface 142. The system 100 may create the first blockchain object 108X using the machine-readable instructions in the blockchain object template 111. The event stack 104 may receive the values and initialize the first blockchain object 108X with the values. The system 100 may store different blockchain object templates for different types of workflows, which may include code for different types of blockchain objects. In an example, the system 100 may select a template that corresponds to the type of blockchain object being created based on the role or persona of the participant. Also, a selected blockchain object template may be instantiated with information from the off-chain storage 110 (e.g., the data repository 179). For example, the system 100 may determine based on the off-chain identity of the participant, the role of the participant logged into the system 100 and constraints on the interactions with the blockchain based on the role of the participant. The system 100 may then select the appropriate blockchain object template for the template and may place constraints on values that can be instantiated for parameters in the selected template based on the constraints for the participant. The parameters in the selected template may be provided from the context schema 196 or configuration file 198.

In an example, the event stack 104 may receive values for parameters in the configuration file 198 from the blockchain oracle 146. For example, the off-chain storage 110 may include many of the values that are predetermined for the participant logged into the system 100. For example, the blockchain identity of the participant and the associated off-chain identify may be stored in the memory 103 or the data repository 179. The blockchain identity may include a cryptographic key, roles of the participant, and constraints on interactions with the blockchain objects that may be used for creating and deploying and managing interactions with the blockchain object 108.

The system 100 may use the blockchain service 188 to deploy the blockchain objects 108X and/or 108Y to blockchain 120X and/or 120Y. The system 100 may use the identity service 192 and the signing service 148 to cryptographically sign the blockchain object 108X and/or 108Y using the public 186/private keys 184 of the participant before deploying the first blockchain object 108X to the first blockchain 120X.

The system 100 may also use the private key 184 and the public key 186 of the participant to authenticate events to and from the blockchain 120X and/or 120Y. Once deployed, the system 100 may receive an address from the blockchain 120X and/or 120Y. The address uniquely identifies the first blockchain object 108X on the first blockchain 120X. The system 100 may store the address in the data repository 179. The system 100 may also store information such as the location of the first blockchain object 108X. For example, the identity of the first blockchain 120X where the first blockchain object 108X is deployed. In an example, the system 100 may deploy dependencies for the first blockchain object 108X before deploying the first blockchain object 108X. For example, the system 100 may deploy a cryptlet or oracle to retrieve real-time data from one or more external sources on a periodic basis before deploying the first blockchain object 108X. Also, the system 100 may use the storage service 143 to store the first blockchain object 108X along with the configuration file 198 in the off-chain storage 110. The off-chain storage 110 may store hashes, such as the hash 170, to verify the data stored on the off-chain storage 110 matches the first blockchain object 108X deployed to the first blockchain 120X. The system 100 may use a blockchain ID (identifier) 174 of the first blockchain 120X to choose the blockchain for deploying the first blockchain object 108X. For example, the system 100 may use a unique ID for each blockchain such as a unique ID for Ethereum™. Although described with reference to the first blockchain object 108X and/or the first blockchain 120X, the system 100 may provide similar functionality to other blockchain objects and/or blockchains.

In an example, the deployed first blockchain object 108X may be executed simultaneously on virtual environments on distributed peers depending on the type of blockchain. Also, the system 100 may deploy the first blockchain object 108X on a blockchain without support for the first blockchain object 108X. For example, the first blockchain object 108X may be deployed as cryptlets, and the cryptlets may run in secure enclaves on secure computers that may be off-chain. The cryptlets running in secure enclaves may be hashed, and the hash deployed on the blockchain without support for the first blockchain object 108X executing on a peer of the peer-to-peer network mining the first blockchain 120X. Thus, the system 100 may support the use of blockchain objects with machine-readable instructions on different blockchains with and without support for blockchain objects with machine-readable instructions that may be executed on a peer of the network of peers mining the blockchain.

The system 100 may receive an event from a source external to the system 100 through the input service 115. For example, the input service 115 may receive interest rates periodically. Assume the first blockchain object 108X and the correlated second blockchain object 108Y uses the interest rates to determine payment to an entity; the system 100 serves as a bridge between the external world and the first blockchain object 108X and/or the second blockchain object 108Y. The input service 115 may digest the event, identify the first blockchain object 108X and/or the second blockchain object 108Y that may use the event and place the event on the event stack 104. The blockchain service 188 may retrieve the event from the event stack 104 and deploy the event to the first blockchain 120X and/or the second blockchain 120Y as a message addressed to the first blockchain object 108X and/or the second blockchain 108Y respectively. In an example, the input service 115 may receive events (e.g., interactions from the participant) from the user interface 142 to perform actions on the first blockchain object 108X and/or the second blockchain object 108Y. In another example, the API 106 may receive events from the user interface 142 to perform actions on the first blockchain object 108X and/or the second blockchain object 108Y and place the events on the event stack 104. The input service 115 may place these events on the event stack 104 for processing. The event stack 104 may provide for a queue of events that may be processed by the different services on the system 100.

In an example, when the system 100 receives an event from the participant to sell a car on the blockchain 120, the system 100 may identify the participant using the identity service 192. Once the participant is identified, the system 100 may retrieve further events from the off-chain storage 110 or the first blockchain 120X and/or the second blockchain 120Y to identify events associated with the identified participant. Based on the context generated from these events and the context schema 196, the system 100 may use the user interface generator 140 to display a user interface 142 to the participant. For example, based on the state of the first blockchain object 108X and/or the second blockchain object 108Y, the screens may vary. The configuration file 198 may provide contextual information about the user interface to use based on the state of the first blockchain object 108X and/or the second blockchain object 108Y. For example, when the state of the first blockchain object 108X and/or the second blockchain object 108Y is pending inspection, the seller may have the actions accept, terminate and reject (see, e.g., FIGS. 8-9). The system 100 may show the user interface shown in the FIGS. 7 and 8 based on the state of the first blockchain object 108X.

After deployment of blockchain objects 108X and/or 108Y to blockchains 120X and/or 120Y, the system 100 may provide an interface between an event and blockchain objects 108X and/or 108Y using message blockchain objects addressed to blockchain objects 108X and/or 108Y. The first blockchain object 108X and/or the second blockchain object 108Y on the blockchain 120X and/or 120Y may receive an event as a message blockchain object addressed to blockchain objects 108X and/or 108Y, and system 100 may also store the event in the off-chain storage 110.

The system 100 may provide an interface between the event stack 104 and blockchain objects 108X and/or 108Y based on the context schema 196. For example, the system 100 may synchronize the state of the first blockchain object 108X and the second blockchain object 108Y. Assume a participant interacts with the blockchain object 108X on the first blockchain 120X. The blockchain object 108X may change its state. The blockchain monitor 122 may monitor and queue the change of state on the event stack 104. The system 100 may then deploy a message blockchain object addressed to the second blockchain object 108Y indicating a change of state of the first correlated blockchain object 108X.

In another example, the system 100 may use the event stack 104 to receive an event that may affect the first blockchain object 108X and/or the second blockchain object 108Y after it is deployed on blockchains 120X and/or 120Y. The event may be received from the user interface 142, IoT gateway 102, other applications/systems 107, blockchain oracle 146, blockchain monitor 122, blockchain service 188, etc. For example, the event may be a commodity price, an interest rate, a participant interaction with blockchain objects 108X and/or 108Y, etc. that affects blockchain objects 108X and/or 108Y. The system 100 may use the configuration file 198, which stores parameters types and constraints for blockchain objects 108X and/or 108Y, to determine whether the event may affect blockchain objects 108X and/or 108Y and updates blockchain objects 108X and/or 108Y accordingly. Also, the system 100 may use the input service 115 to determine whether an event received from the first blockchain 120X and/or 120Y through the blockchain monitor 112 invokes a change in the state of blockchain objects 108X and/or 108Y. For example, the first blockchain object 108X may change its state based on an interaction from a participant external to the system 100 on a node of the peer-to-peer network participating in the first blockchain 120X. Also, blockchain objects 108X and/or 108Y may deploy a message blockchain object to a new block on blockchains 120X and/or 120Y to receive an additional parameter. For example, the system 100 may deploy an object on blockchains 120X and/or 120Y with an address linked to the blockchain identity of a participant. Blockchain objects 108X and/or 108Y may deploy a new message blockchain object addressed to a participant blockchain object linked to the blockchain identity of the participant to request a parameter from the system 100. For example, in the event of a conditional offer from a buyer, the first blockchain object 108X may request an additional parameter such as an acceptance or rejection of the conditional offer. In another example, an exception due to the parameters exceeding a threshold may request an additional parameter from the system 100. The system 100 may monitor the plurality of events in the new block of blockchains 120X and/or 120Y to identify an event associated with the first blockchain object 108X or a participant in the system 100 and place the event on the event stack 104.

The configuration file 198 may also describe the properties of blockchains 120X and/or 120Y on which blockchain objects 108X and/or 108Y are deployed, a state map with the current state, possible actions of blockchain objects 108, parameters for the actions, personas that may be involved in the actions, and content that may be displayed in the user interface 142 that is associated with interacting with blockchain objects 108X and/or 108Y. A participant may generate an event (e.g., a message addressed to blockchain objects 108X and/or 108Y) to interact with the blockchain objects 108X and/or 108Y through the user interface 142. The user interface generator 140 may vary the user interface 142 based on the current state of blockchain objects 108X and/or 108Y, the persona of the participant interacting with blockchain objects 108X and/or 108Y, and the properties of blockchain objects 108X and/or 108Y. For example, the user interface 142 may display one GUI for a participant with the persona of a seller and may display a different GUI for a participant with the persona of a buyer. Each GUI may allow the user to perform a particular action (e.g., accept an offer, reject an offer and the like) associated with blockchain objects 108X and/or 108Y depending on constraints that may be specified in the configuration file 198. The configuration file 198 may include a user interface (UI) list 173 that includes details of the GUIs to display depending on a variety factors, such as persona, state of blockchain objects 108X and/or 108Y, available actions of blockchain objects 108X and/or 108Y, a list of parameters 175 of the actions, the blockchain(s) where blockchain objects 108X and/or 108Y are deployed or are about to be deployed, participant context information and the like.

Once deployed blockchain objects 108X and/or 108Y may change their state based on message blockchain objects addressed to blockchain objects 108X and/or 108Y from different participants. In an example, a participant may interact with blockchain objects 108X and/or 108Y independent of system 100. In another example, the participant may interact with blockchain objects 108X and/or 108Y through the system 100. For example, assume the blockchain object manages and enforces constraints between participants during a sale of an asset. The system 100 may be used by the seller of the asset to deploy the first blockchain object 108X to the first blockchain 120X. A buyer may then interact with the first blockchain object 108X through the system 100 or another system that is isolated from the system 100. In another example, the system 100 may be shared by the buyer and seller, but the data of the seller and the buyer may be isolated using their off-chain identities.

The system 100 may receive a plurality of events at the event stack 104. For example, the system 100 may receive events that pertain to the sale of the asset, such as an offer from a buyer participant. The blockchain monitor 122 may identify the event in the event stack 104 as an event that may affect blockchain objects 108X and/or 108Y. The system 100 may send a message blockchain object addressed to synchronize blockchain objects 108X and 108Y. For example, if the event originated in the first blockchain 120X, the system 100 may deploy a message blockchain object addressed to the second blockchain object 108Y on the second blockchain 120Y if the event was generated on the first blockchain 120X where the corresponding first blockchain object 108X is deployed.

The system 100 may generate a notification for display to the participant whose action may be impacted by the event. The system may receive a response from the participant using the user interface 142. The system 100 may then generate a message blockchain object addressed to blockchain objects 108X and/or 108Y based on the identified event and the response from the participant. The system 100 may use the blockchain service 188 to deploy the message blockchain object to the blockchain 120X and/or 120Y. In an example, assume the system 100 receives an appraisal from an appraiser via another system 107 (e.g., an email message). The system 100 may use the input service 115 to determine the identified event may affect blockchain objects 108X and/or 108Y. The system 100 may then generate a message addressed to blockchain objects 108X and/or 108Y based on the identified event to blockchains 120X and/or 120Y. For example, the system 100 may address the message to both the first blockchain object 108X and the second blockchain object 108Y if the event is generated on the system 100 or external to the blockchains. For example, the event may be a Twitter™ message or a stock price, an interest rate or the like. The system may generate and deploy a message blockchain object addressed to the first blockchain object 108X, and a message blockchain object addressed to the second blockchain object 108Y. In an example, the blockchain monitor 122 and/or the input service 115 may identify the event based on the configuration file 198 and information in the data repository 179 for blockchain objects 108X and/or 108Y. For example, the configuration file 198 may include details in the state list and the action list for that state and parameters that may cause a change in the state. The values of the parameters, the current state, previous state, etc., may be stored in the data repository 179. The system 100 may check the parameters in the configuration file 198 against the variables in events to determine events that may change the state of blockchain objects 108X and/or 108Y.

In some instances, blockchain objects 108X and/or 108Y may change state due to interactions with one or more participants independent of the system 100. In these instances, the system 100 may receive notification of the change in state and may store the change in state (e.g., blockchain objects 108X and/or 108Y with the changed state) in the off-chain storage 110, so an image of blockchain objects 108X and/or 108Y with the latest state deployed on blockchains 120X and/or 120Y is stored in the off-chain storage 110. For example, the system 100 may receive a block update from the first blockchain 120X indicating a change in state in the first blockchain object 108X. The system 100 may determine a plurality of events in the block update and store the events on the event stack 104 for processing by services of the system 100. In an example, the system 100 may determine whether an event in the block update changes the state of the first blockchain object 108X. In response to a determination that the event in the block update changes the state of the first blockchain object 108X, the system 100 may then update the state of the first blockchain object 108X on the off-chain storage 110. Also, the system 100 may update the state of the second blockchain object 108Y on the second blockchain 120Y. The system 100 may notify a participant associated with the first blockchain object 108X through the user interface 142 regarding a change in state of the first blockchain object 108X and may facilitate the participant to interact with the first blockchain object 108X via the user interface 142.

Also, a message blockchain object may address the blockchain object 108. Objects on the blockchain may interact with each other for different reasons. For example, a blockchain object may be a utility blockchain object that provides specific information to the first blockchain object 108X. Assume, an interaction is constrained with security locks from two participants. A utility blockchain object on blockchains 120X and/or 120Y may determine whether the security locks have the necessary state for both the participants. In another example, the system 100 may determine whether an event for a block update to the blockchain object 108X includes a utility blockchain object addressing the first blockchain object 108X. The system 100 may determine the context of the interaction between the first blockchain object 108X and the utility blockchain object 108X. The system 100 may then place an event on the event stack 104 for other services to process the interaction. The system 100 may store the event on the off-chain storage 110, and the system 100 may use the event to determine the actions available to a participant for blockchain objects 108X and/or 108Y.

The system 100 may receive a request from blockchain objects 108X and/or 108Y. In an example, the blockchain objects 108X may deploy a message to the blockchain to request additional information such as a parameter in a smart contract, a request to authenticate a participant in a transaction, a request for information from a participant and the like. For example, blockchain objects 108X and/or 108Y may request the current interest rates. The system 100 may receive the request as an event at the event stack 104. Examples of a request may include a request for authentication of a participant, request for a decision on a conditional acceptance, request for a further description of an asset for sale, request for a set of instructions to handle an exception and the like. In an example, the system 100 may receive a block update from blockchains 120X and/or 120Y. The system 100 may identify a plurality of events in the block update. The system 100 may then determine whether the block update includes a request from blockchain objects 108X and/or 108Y for information, such as a parameter in a smart contract. For example, the system 100 may determine whether the plurality of events includes a request from blockchain objects 108X and/or 108Y. The system 100 may generate a message blockchain object addressed to blockchain objects 108X and/or 108Y with the requested information. The system 100 may deploy the message blockchain object 108X and/or 108Y to blockchains 120X and/or 120Y. For example, the blockchain service 188 may deploy the message to the blockchain 120X and/or 120Y. Thus, the system 100 may provide an interface for blockchain objects 108X and/or 108Y to request an event. Examples of requests received from the blockchain objects 108X and/or 108Y may include requests for a parameter, requests on how to handle exceptions, notifications of exceptions, and the like.

The system 100 may receive a block update from a blockchain at the event stack 104. The system 100 may identify blockchain objects 108X and/or 108Y in the block update. For example, blockchain objects 108X and/or 108Y may change state. Blockchain objects 108X and/or 108Y with the new state may be stored on a new block of blockchains 120X and/or 120Y. The system 100 may determine a cryptographic signature of blockchain objects 108X and/or 108Y. For example, the system 100 may determine the public key 186 that corresponds to the private key 184 used to generate the cryptographic signature of blockchain objects 108X and/or 108Y from a database of public keys that are authenticated. For example, public keys may be stored and authenticated in a circle of trust and placed online in a database accessible by anyone. A public key may be used to identify the blockchain identity of the participant associated with the blockchain object. The system 100 may determine a participant associated with blockchain objects 108X and/or 108Y based on the cryptographic signature and the context schema. The system 100 may then determine a GUI for blockchain objects 108X and/or 108Y based on the context schema 196. The system 100 may display the GUI in the user interface 142 to allow the identified participant to interact with blockchain objects 108X and/or 108Y.

The system 100 may use the hashing service 144 to generate the hash 170 of blockchain objects 108X and/or 108Y before deploying blockchain objects 108X and/or 108Y and/or the hash 170 to blockchains 120X and/or 108Y. Also, the hashing service 144 may be used to include references of data in the off-chain storage 110 to prove chain of custody, proof of custody and proof against tampering.

In an example, the system 100 may deploy the first blockchain object 108X to the first blockchain 120X. Then, the system 100 may deploy the hash 170 of the first blockchain object 108X to the second blockchain 120Y instead of the first blockchain object 108X on a blockchain accessible to participants of the second blockchain 120Y. Deploying the hash 170 instead of the first blockchain object 108X on the second blockchain 120Y may allow the system 100 to deploy the first blockchain object 108X to multiple blockchains, where one or more of the blockchains may be unavailable to participants in a transaction regulated by the correlated blockchains 108X and/or 108Y. For example, some of the participants may be part of a private consortium blockchain. Thus, the hashing service 144 may allow for multiple blockchain transactions using the correlated blockchain objects 108X and/or 108Y deployed on multiple blockchains. The system 100 may verify change in state of the first blockchain object 108X deployed on the first blockchain 120X (e.g., consortium blockchain).

In another example, the system 100 may deploy the hash 170 of blockchain objects 108X and/or 108Y on public blockchains, consortium blockchains and the like. For example, the system 100 may deploy the first blockchain object 108X on the first blockchain 120X (e.g., a consortium blockchain and deploy a hash of the first blockchain object 108X) in place of the second blockchain object 108Y on public blockchains or other systems outside the first blockchain (e.g.) consortium blockchain). The system 100 may then generate correlation id 162 linking the hash blockchain object on the public blockchain with the first blockchain object 108X. Thus, the first blockchain 120X may be a private blockchain and the second blockchain 120Y may be a public blockchain. The second blockchain 120Y may be a hash of the first blockchain object 108X deployed on the first blockchain 120X. Thus, the system 100 may allow the use of the first blockchain object 108X on the public blockchain, without disclosing the contents or code of the first blockchain object 108X. However, the hash 170 of the first blockchain object 108X may serve as immutable proof of the state of the first blockchain object 108X. The system 100 may allow the first blockchain object 108X to be used for services on the cloud by deploying the hash 170 of the first blockchain object 108X and sharing the first blockchain object 108X on a cloud service between participants. For example, the system 100 may share the first blockchain object 108X privately with the participants who have access to only the public blockchain through other services on the system 100. The events are proofed using hashes stored in the public blockchain, and the first blockchain object 108X and its constraints may be provided as a cloud service.

For example, assume the first blockchain object 108X is deployed on the first blockchain 120X (e.g., a private blockchain) and the second blockchain object 108Y (e.g., a hash blockchain object) is deployed on the second blockchain (e.g., a public blockchain). The system 100 may use the blockchain monitor 122 to examine the block updates on the second blockchain 120Y to determine message blockchain object addressed to the second blockchain object. In an example, the second blockchain object 108Y may be a passive blockchain object. The blockchain monitor 122 may play the event, i.e., message blockchain object on the event queue. The system 100 may then use a service such as the blockchain oracle 146 and/or the input service 115 to determine the current state of the first blockchain object 108X based on the configuration file 198 and the state list 176. The blockchain oracle 146 may then determine the action or actions available in the current state based on the actions list 178. The blockchain service 188 may be used to deploy a message object to the blockchain 120X to change the state of the first blockchain object 108X. The system 100 may the post a hash of the first blockchain object 108X with its new state on the second blockchain 120Y to confirm a change in the first blockchain object 108X on the first blockchain 120X.

Thus, the system 100 may allow the participants to interact with blockchain objects on multiple blockchains. In examples, some of the participants may be on private blockchains. The system 100 may also allow the participants to interact with blockchain objects on private blockchains without direct access to the blockchain object or the private blockchain. In another example, the system 100 may allow two or more blockchains that are private to be used without exposing the private blockchain to participants that are not authorized to access the private blockchain. For example, the first blockchain 120X and the second blockchain 120Y may be private blockchains. The participants on the first blockchain 120X may not have access to the second blockchain 120Y and the participants on the second blockchain 120Y may not have access to the first blockchain 120X. For example, the system 100 may use the correlation id 162 and a hash of the first blockchain object 108X on the second blockchain 120Y and the interface to allow blind ledger transactions. Similarly, the system 100 may use a hash of the second blockchain object 108Y on the first blockchain 120X and the interface through the event stack 104 to allow the transactions between two private blockchains.

In an example, the hashing service 144 may be used to establish proof of chain of custody, proof of possession of a digital asset and/or proof against tampering. For example, the hashing service 144 may store the hash of a document on the blockchain. The hash of the document is a destructive process that uniquely identifies the document, however, does not allow the recreation of the document. Thus, the hashing service 144 may be used to store digital assets in the off-chain storage 110 while establishing custody of digital assets that may include personally identifiable information. In an example, the hash may be used to verify the digital asset has not been modified or tampered with.

In an example, the hashing service 144 may determine the hash of a digital asset and place the hash on blockchains 120X and/or 120Y. Blockchain objects 108X and/or 108Y may validate the digital asset has not tampered, establish a chain of custody and proof against tampering. In an example, the digital asset may be a picture. The hashing service 144 hash the picture and deploy the hash of the picture on blockchains 120X and/or 120Y. The hashing service 144 may be used to determine whether the picture was modified or tampered by determining the hash of the picture at a later date. A change in a byte of the picture will produce a different hash. Thus, the authenticity of the images may be established.

In an example, assume blockchain objects 108X and/or 108Y regulates the interaction between participants for certified organic produce. The hashing service 144 may hash a certificate for the produce and place the hash of the certificate on blockchains 120X and/or 120Y.

In another example, the hashing service 144 may be used to hash the audio/video recordings captured by law enforcement agencies and deploy the hash to the blockchain. The hash on the blockchain is immutable and may serve as proof of custody of the audio/video recordings, also serve as proof of possession at the time the hash was deployed to the blockchain and also provide proof against tampering at a later date.

Similarly, the hashing service 144 may be used to hash a file available for rapid prototyping (e.g., 3D printing), a video or audio licensed (e.g., movies purchased on an Xbox) to a participant, clinical trial reports and the like. The system 100 may then deploy the hash to the blockchain. For example, in the case of clinical trial reports, the hashes or history of hashes may be used to verify the reports are intact and were not tampered with. The system 100 may thus improve the efficiency of regulatory processes.

In an example, data may be stored on the off-chain storage 110, because the data is inappropriate for storage on blockchains 120X and/or 120Y. For example, personal history files, files with personally identifiable information, medical records and the like. The hashing service 144 may be used to store a hash of the data stored in the off-chain storage 110 to authenticate proof of possession at the time the hash was deployed to blockchains 120X and/or 120Y, proof against tampering and proof of chain of custody and the like. In an example, data from government records may be hashed and placed on blockchains 120X and/or 120Y. For example, land ownership records, motor vehicle registration records, licensure information (e.g., doctors, pharmacists, lawyers and the like), change of name information, tax receivables and the like may be hashed using the hashing service 144 and the hashes deployed on blockchains 120X and/or 120Y. Thus, the confidence in government records may be increased while reducing the cost of maintaining these records. The hashing service 144 may be used to identify any anomalies in the records. For example, before a real estate is purchased, the land records may be verified using the hashing service 144. Thus, the hashing service 144 may be used for proof of chain of custody, proof against tampering and proof of possession.

The identity service 192 may reduce the complexity of interacting with blockchains 120X and/120Y for a participant of the system 100. For example, the blockchain identity of the participant may be linked to their off-chain identity such as the first name and last name, an identifier of the role and organization of the participant. The system 100 may create an instance of the context schema 196, i.e., configuration file 198 during deployment. The system 100 may display a user interface 142 to populate an off-chain storage 110 using the configuration file 198 along with the data repository 179 to obtain the context and to associate participants with their personas and their roles. The configuration file 198 along with the data repository 179 in the off-chain storage 110 may associate the persona 171 with a participant on the system 100. In other words, associate an identity or username of the participant with a persona describing the relationship between the participant and the blockchain object 108. For example, assume blockchain objects 108X and/or 108Y is a smartlet for a sale of a car, and the persona of the participant in the system trying to sell the car may be a seller. The configuration file 198 along with the data repository 179 in the off-chain storage 110 may associate the participant with the persona in the configuration file 198. Associating the participant with this persona allows the participant to deploy blockchain objects 108X and/or 108Y to blockchains 120X and/or 120Y to sell the asset. Since the participant is initiating the event, the role 172 of the participant may be that of an initiator. The configuration file 198 may serve a map to retrieve the information from the data repository 179 on the off-chain storage 110 to identify the participant. The configuration file 198 along with the data repository 179 may store the blockchain identity of the participant, the information about the persona who may deploy blockchain objects 108X and/or 108Y, a state list 176 of blockchain objects 108X and/or 108Y listing all possible states of blockchain objects 108X and/or 108Y, and an action list 178 listing the allowed actions of each persona in each state. The system 100 may receive an event associated with blockchain objects 108X and/or 108Y through the user interface 142 and the API 106. For example, through the API 106, the system 100 may receive details about the asset from the participant. In another example, the system 100 may receive an event from the input service 115 or may receive an event from a database of used car prices that can provide pricing event for a used car to be offered for sale.

The system 100 may use a cryptlet or an oracle or other code for post processing events before the event is stored in the off-chain storage 110. The blockchain oracle 146 may retrieve event at periodic intervals based on a set of rules from a storage system or other sources such as live feeds of the event. In an example, the blockchain oracle 146 may be used to periodically scan the events stored in the off-chain storage 110 and trigger actions based on changes to the off-chain storage 110. For example, the off-chain storage 110 may receive new documents, and this may trigger a new event. The new event may be placed on the event stack 104 to be retrieved by other services. Also, post processing service 149 may process the events that are queued by the event stack 104 to identify the relevant events. The post processing service 149 may run in a secure enclave and write the attestable activity to the blockchains 120X and/or 120Y. In an example, the post processing service 149 may write the attestable activity to a consortium blockchain. The consortium blockchain may not allow access to off-chain storage 110 other than through a cryptlet or an oracle due to security restrictions.

The system 100 may also manage blockchain objects 108X and/or 108Y after it is deployed on blockchains 120X and/or 120Y. The blockchain monitor 122 may retrieve events from blockchains 120X and/or 120Y as events are posted on new blocks on blockchains 120X and/or 120Y. The retrieved events from blockchains 120X and/or 120Y may be passed to the event stack 104.

In an example, the system 100 may store in the data repository 179. In an example, the data repository 179 may be divided into three data repositories, namely the meta data store, transactional store and the reporting store.

The metadata store may store configuration for blockchain object 108. The user interface generator 140 may use the meta data to generate user interfaces. The metadata store may also store information about the role information associated with blockchain objects 108X and/or 108Y. In an example, the role information may be used to allow access control for the participants of the system 100 based on the role information.

The transaction store may store the location where blockchain objects 108X and/or 108Y is stored in blockchains 120X and/or 120Y, the transaction requests (e.g., offer for sale or counter-offer and the like), properties of the blockchain object 108X and/or 108Y (e.g., state, who may interact, how to interact, the format of the messages, the format of the interaction and the like), the blockchain identities of the participants, the blockchain identities of the participants who requested the transactions (e.g., offer for sale or counter-offer and the like), the identity of blocks in the blockchain where the transactions were requested and the like.

The reporting store may include a combination of the information in the metadata store, the transactional store that may be structured using the procedures and constructs such as the logic expressed in the configuration file 198 (e.g., logic for the blockchain object 108). For example, the reporting store may allow the structuring of events in the data repository 179. The structuring of the events in the data repository 179 may allow the data to be queried by services that are not designed to interact with the blockchain. For example, analytics and/or reporting services may access the structured data in the reporting store.

Additionally, the input service 115 may receive events from other external sources to manage blockchain objects 108X and 108Y after being deployed. The sources may include cryptlets or other sources such as IoT gateway 152 or the systems/applications 107. Information from the sources are authenticated and received via the input service 115 may be used by the system 100 to post messages to blockchain objects 108X and/or 108Y on blockchains 120X and/or 120Y. For example, the blockchain objects 108X and/or 108Y may offer a car for sale on blockchain 120X and/or 120Y provided the car has not been offered in another off-chain auction. The input service 115 may receive regular updates about the off-chain auction and when confirmation is received from the off-chain auction that the car has been sold via the auction, the system 100 may send a message blockchain object to blockchain objects 108X and/or 108Y to change the status of blockchain objects 108X and/or 108Y to indicate the car is no longer available for sale. The system 100 may post a message to blockchain objects 108X and/or 108Y by posting a message blockchain object addressed to blockchain objects 108X and/or 108Y in blockchains 120X and/or 120Y.

The event stack 104 along with blockchain monitor 122 may be used to synchronize changes of state and events for blockchain objects 108X and/or 108Y between blockchains 120X and 120Y and the off-chain storage 110. Similarly, the storage service 143 may synchronize any changes to blockchain objects 108X and/or 108Y originating from the system 100. The storage service 143 may store a copy of blockchain objects 108X and/or 108Y, transactions on blockchains 120X and/or 120Y, states of blockchain objects 108X and/or 108Y, hash 170 of blockchain objects 108X and/or 108Y and subsequent hashes if blockchain objects 108X and/or 108Y is changed, and the configuration file 198 on the off-chain storage 110. A hash may be used to indicate a state of blockchain objects 108X and/or 108Y on blockchains 120X and/or 120Y at a particular point in time. The system 100 may use the hashes to determine whether the data stored in the off-chain storage 110 matches the data stored in blockchains 120X and/or 120Y.

The system 100 may retrieve events from the off-chain storage 110, the blockchains 120X and/or 120Y, and/or both. The system 100 may generate contextual information from the events using the configuration file 198. For example, the system 100 may also use the identity service 192 to identify a participant associated with the events received from blockchains 120X and/or 120Y based on cryptographic signatures of the retrieved events from the blockchain. Also, the time stamps of retrieved objects or events may provide additional context of the event. The additional context may include details such as the role of the participant in a retrieved event such, the status of blockchain objects 108X and/or 108Y, the future states for blockchain objects 108X and/or 108Y, additional inputs for the change of state of blockchain objects 108X and/or 108Y and the like. Thus, the system 100 also manages blockchain objects 108X and/or 108Y when changes are triggered by blockchain objects 108X and/or 108Y by deploying a new blockchain object in the block update of blockchains 120X and/or 120Y.

The off-chain storage 110 may be linked to cryptlets or oracles as discussed above. For example, the off-chain storage 110 may have associated services that trigger event notifications periodically or when certain changes occur. For example, the off-chain storage 110 may trigger a change when changes are made to documents stored in the off-chain storage 110. For example, if a loan approval is received as a change to a document, it may trigger approval of an event for blockchain objects 108X and/or 108Y that is dependent on the loan approval. In an example, the event may be received by the event stack 104. The system 100 may utilize the event to identify blockchain objects 108X and/or 108Y that may be notified of the change using the configuration file 198. The identity of blockchain objects 108X and/or 108Y may be stored in the data repository 179 in the off-chain storage 110 and may be accessed using the schema described in the configuration file 198 along with the type information for the information to obtain context. The system 100 may trigger a change to blockchain objects 108X and/or 108Y by sending a message to blockchains 120X and/or 120Y through the blockchain service 188. The signing service 148 may sign the message using the keys of a participant. In an example, the message may be signed using the private key 184 of the participant. Thus, the system 100 can effectively manage blockchain objects 108X and/or 108Y on blockchains 120X and/or 120Y.

Although system 100 is described with reference to generating user interface 142 for interaction with one or more participants of the system, the system 100 may be used in another embodiment without the portal to create, authorize, manage and deploy blockchain object 108X and/or 108Y to blockchains 120X and/or 120Y. In an example, the system 100 may allow one or more components to be used to allow interaction between blockchain objects 108X and/or 108Y and other services or applications. Examples of other services include Product as a Service (PaaS), Infrastructure as a Service (IaaS), and System as a Service (SaaS). For example, the system 100 may allow a machine-based interaction to create, authorize, manage and deploy blockchain objects 108X and/or 108Y. In an example, authorize may mean authorizing participants to deploy specific instances of blockchain objects 108X and/or 108Y or interacting with an already deployed blockchain objects 108X and/or 108Y on the blockchains 120X and/or 120Y.

Figure 4:
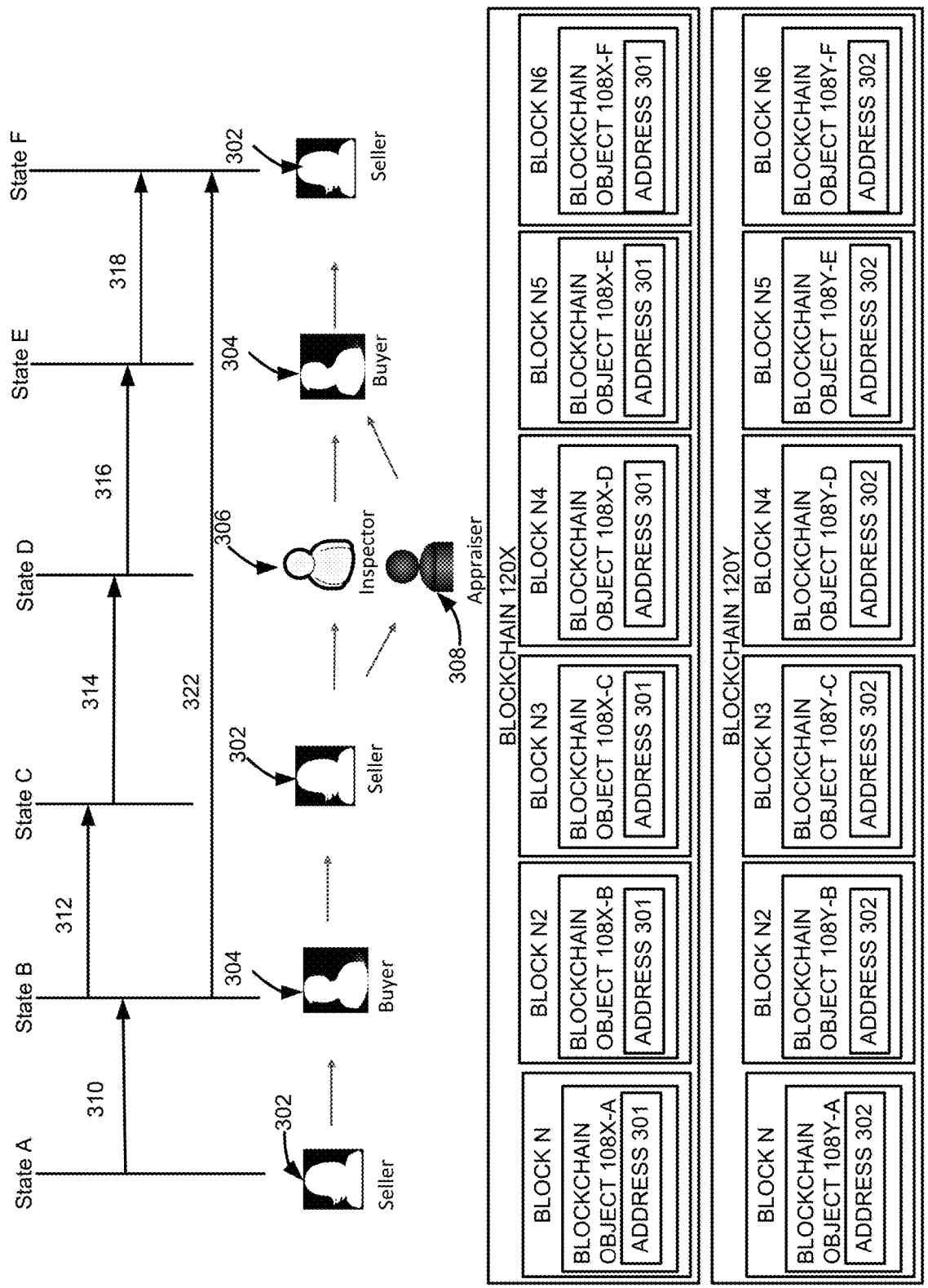
FIG. 4 illustrates an example of state transitions between different states of a blockchain object, according to an embodiment of the present disclosure.

FIG. 4 shows an example of states of blockchain objects 108X and/or 108Y tracked by the system 100. In this example, assume blockchain objects 108X and/or 108Y governs interactions between participants during the sale of an asset. The blockchain objects 108Z and 108Y are generated, deployed and managed by the system 100. The first blockchain object 108X and/or 108Y may include machine-readable instructions to govern the interactions between participants. Examples of participants may include a seller 302, a buyer 304, an inspector 306 and an appraiser 308. Blockchain object 108X and/or 108Y may also store the current state of the asset. FIG. 4 shows an example whereby the system 100 tracks six states A-F for blockchain objects 108X and/or 108Y (shown as 108X in states A-F). For example, blockchain objects 108X and/or 108Y may transition between six different states before the conclusion of the sale of the asset. State A depicts an offer for sale of the asset from seller 302 to buyer 304. State B is a conditional acceptance subject to inspection, from the buyer 304 to the seller 302. State C is a request for inspection from the seller 302 to an inspector 306 or a request for appraisal from the seller 302 to an appraiser 308 and acceptance of the request by the inspector 306. State D is delivery of an inspection report to the buyer 304. State E is a transfer of consideration from the buyer 304 to the seller 302. State F is a completed sale of the asset. A new blockchain object may be created for each state, shown in the figure as blockchain objects 108X-A-108X-F and/or 108Y-A-108X-F, and each blockchain object may be stored on a new block, shown as blocks N-N6, of blockchains 120X and/or 120Y. For example, blockchain objects 108X-A and/or 108Y-B may be deployed by the seller 302 using the system 100. In an example, the seller 302 may have access to only the blockchain 120X. The seller 302 may be part of a consortium where the inspector 306 and the appraiser 308 use the second blockchain 120Y. In examples, blockchains 120X and/or 120Y may be public or private blockchains accessible only to authorized participants. For example, a consortium blockchain may be a private blockchain that allows only entities with a ring of trust to access the blockchain. For example, assume the inspector 306 and the appraiser 308 are part of a private blockchain. In an example, a mortgage lender may use inspectors and appraisers who are independent contractors. However, the mortgage lender may wish to minimize exposure of the inspector 306 and the appraiser 308 details to the seller 302 and the buyer 304. The mortgage lender may use a private blockchain for inspectors 306 and 308. However, it may be advantageous to allow smart contracts to govern interactions between the participants interacting with the blockchain object 108X and/or 108Y.

The system 100 may facilitate such interaction between a blockchain object on a private blockchain and a blockchain object on the public blockchain using hashes. For example, as described above with reference to FIG. 3, the system 100 may deploy a hash of the first blockchain object 108X as the second blockchain object on the second blockchain 120Y. The system 100 may monitor the second blockchain 120Y to determine whether a message is directed to the address of the hash on the second blockchain 120Y. The system 100 may then receive the message via the event stack 104 and deploy a message blockchain object to the first blockchain 108X addressing the first blockchain object 108X. The first blockchain object 108X may serve as the master and control the change of states. In another example, the system 100 may provide an oracle or a cryplet to control the change of state. In another example, the first block chain object and the second blockchain object may be cryptlets that execute in a secure enclave.

The blockchain object 108B may be generated as a result of the interaction between a message (e.g., a message blockchain object) from the seller 302 and the blockchain object 108A-X stored on block N2 of the blockchains 120X and/or 102Y. In addition to states A-F, the system 100 may track the states created, active, terminated, completed, inspected and appraised for the blockchain object as shown in FIG. 6 to track the intermediate states between the transitions A-F described in this figure.

To interact with the blockchain object 108X (in state A), the buyer 304 may send an event (e.g., a message to the blockchain object 108X addressed using a unique identifier of the blockchain 108X-A) to the first blockchain 120X. A node in a peer-to-peer network of nodes mining the first blockchain 120X to generate a consensus may receive the event, and process the event for generating new block N2 of the first blockchain 120X. In an example, the event (e.g., a blockchain object message) may be addressed to an address 301 (e.g., 0xBB9bc244D798123fDe783fCc1C72d3Bb8C189413) of the blockchain object 108X-A. The event may include the terms of the conditional acceptance of the buyer 304 to the seller 302. In an example, the node may execute the blockchain object 108X-A with the information in the event from the seller 302. The blockchain object 108X-A's code 109 (e.g., machine-readable instructions or logic), when executed, may determine whether the event changes the state of the blockchain object 108X-A. The blockchain object 108X-A may then store any change in state such as acceptance of the offer on the first blockchain 120X. In an example, the node may store the acceptance of the offer or rejection of the offer on a new block of the first blockchain 120X, as shown by the blockchain object 108X-B stored on block N2, and use the blockchain object 108X-B to build a new block N2 and generate a consensus on the new block. The new block once generated is pushed to peers and is validated by the peers once they start working on the next block based on the new block pushed out by the node.

The system 100 may then determine from the new block update whether the first blockchain object 108X has changed its state. The blockchain monitor 122 may, for example, determine whether the block update includes changes to the state of the first blockchain object 108X. The system 100 may then send a message blockchain object addressed to the second blockchain object 108Y to synchronize the state of the first blockchain object and the second blockchain object.

Similarly, the blockchain objects 108C-F shown in FIG. 4 may be generated and placed on one or more blocks of the blockchains 120X and/or 120Y.

In an example, where the first blockchain object 108X and the second blockchain object 108Y include machine-readable instructions that govern the interaction between the participant, the system 100 may include machine-readable instructions in the first blockchain object 108X and/or the second blockchain object 108Y to determine a master-slave relationship between the first blockchain object and the second blockchain object. For example, the machine-readable instructions in the second blockchain object 108Y may require confirmation in response to an offer from the buyer 304 from the first blockchain object 108Y before changing the state. In another example, the machine-readable instructions may be based on a master-master configuration where a change of state of the first blockchain object 108X may be subject to confirmation from the second blockchain object 108Y and vice-versa. The machine-readable instructions may also conflict resolution protocol in case of nearly simultaneous offers from different buyers on the first blockchain 120X and/or the second blockchain 120Y. For example, the first blockchain object 108X and/or 120Y may accept the offer with the earlier time stamp.

In another example, the system 100 may facilitate interaction between the first blockchain object 108X on the blockchain 120X and a participant on the second blockchain 120Y via the event stack 104. In an example, the appraiser 308 may use the second blockchain 120Y. The system 100 may allow the appraiser 308 to interact with the first blockchain object 108X using hashes of the second blockchain object 108Y. In another example, the system 100 may serve as a link between the first blockchain object 108X and the second blockchain object 108Y.

FIG. 4 is further described below with respect to the components of the system 100 shown in FIG. 3. In this example, assume the seller 302 creates the blockchain object 108X-A in state X through the system 100. The system 100 may store contextual data (e.g., seller's profile) for the seller 302, which may be created when the seller 302 initially registers with the system 100 or is otherwise created when information for the contextual data (e.g., seller's profile) is collected by the system 100. To create the blockchain object 108X-A-X, the seller 302 may log into the system 100 with a username and password. From the login information, the identity service 192 may query the off-chain storage 110 to determine contextual data of the seller 302, such as the seller's role 172, persona 171, etc. In an example, the identity service 192 may obtain the contextual data of the seller (e.g., seller's profile) from the data repository 179 using the schema of the configuration file 198. The configuration file 198 may also associate the real-world identity of the seller 302 with a blockchain identity of the seller. The blockchain identity may be based on the public key, private key cryptography. The off-chain identify of the seller 302 may be the role 172 and the persona 171 of the seller. For example, in a used car sales organization, the seller may be a manager. The manager may be allowed to create blockchain objects to sell cars and may have the authorization to perform certain actions. The configuration file 198 may describe the persona 171 allowed to interact and their actions in the form of the action list 178. The data repository 179 may store specific details such as identities of the persona 171 in the system 100, their first name and last name and the like based on the schema described in the configuration file 198. The blockchain identity of the seller 302 may be used to sign the first blockchain object 108X-A.

The system 100 may present the seller 302 with a GUI in the user interface 142 to create the blockchain object 108A based on the contextual data of the seller 302 as described above with reference to FIG. 3. The GUI may allow the seller 302 to generate the blockchain object 108A for sale of the asset using the context schema 196. In an example, the system 100 generates the configuration file 198, as an instance of the context schema 196, during generation of the blockchain object 108X and/or 108Y. The system 100 may determine the persona, role, actions, parameters and the like based on the contextual data.

GUIs in the user interface 142, the system 100 may present the seller 302 with prompts to complete one or more parameters pertaining to the first blockchain object 108X-A being created that may not be ascertainable from the contextual data. In an example, the system 100 may obtain the parameters for the sale of the asset such as the offer price, the terms of the offer, participants who may accept the offer, etc. The parameters for the sale of the assets may be stored in the data repository 179 based on the schematic information (e.g., type of each parameter) in the configuration file 198. The parameters for the sale of the assets may also be stored on blockchain objects 108X and/or 108Y. Blockchain objects 108X and/or 108Y may be created based on the information stored in the data repository 179 and the contextual information in the configuration file 198. The signing service 148 may use the private key 184 (assuming the private key 184 and the public key 186 are for the seller 302) to sign the blockchain object 108X and/or 108Y, and the blockchain service 188 may deploy the signed blockchain object 108X and/or 108Y on blockchains 120X and/or 120Y. In an example, blockchain objects 108X and/or 108Y may store its current state in its internal memory. The blockchain object 108X and/or 108Y may also be stored, along with its hash, in the off-chain storage 110. Also, the system 100 may initially set the state of the blockchain object 108X to state A. In an example the current state may be stored in the off-chain storage 110. The blockchain object 108X in state A may include the parameters of the offer such as the offer price, terms of the offer, whether the offer is an open offer or is restricted to certain parties and the like, and this information along with the current state of the blockchain object 108X-A may also be stored in the data repository 179 using the contextual information available in the configuration file 198.

When the blockchain object 108X and/or 108Y in state A is created, the system 100 may also store in the data repository 179 the values of the state list 176 of the blockchain object 108A listing the current state. In an example, the system 100 may generate a correlation id 162 to link the first blockchain object 108X and/or 108Y. Additionally, the configuration file 198 may provide contextual information such as a previous state and the possible state transitions, and all possible states of blockchain objects 108X and/or 108Y, and the action list 178 lists the allowed actions of each persona in each state. The state list 176 may specify a sequence of state transitions that are allowed to occur and may also specify allowed transitions from a current state to a next state. For example, blockchain objects 108X and/or 108Y in state A may transition to a defined list of states from its current state. The defined list of states may include acceptance of the offer, counter-offer, modification of the offer and withdrawal of the offer. The action list 178 may specify the personas who may interact with blockchain objects 108X and/or 108Y in state A and the actions available to a persona in each state of the blockchain object 108X and/or 108Y in state A. For example, the action list 178 may specify that when the blockchain objects 108X and/or 108Y is in state A, a participant that has the persona of a buyer is allowed to interact with blockchain objects 108A and/or 108Y and can interact with the blockchain object 108X and/or 108Y in state A to make an offer. The transition diagram shown in the figure shows a couple of different transitions mapped in the state list 176 such as state A, state B and state F (shown as 310, 312) as one possible set of states. In another example, the blockchain 108X and/or 108Y may transition from state A through state F (shown as 310, 312, 314, 316 and 318).

The system 100 may access the configuration file 198 to obtain context information about the blockchain object 108X and/or 108Y in the state. Also, the blockchain object 108X and/or 108Y in state A along with the data repository 179 may be accessed in the off-chain storage 110 to determine the current state of blockchain objects 108X and/or 108Y in state A. In an example, the system 100 may authenticate the identity of the seller 302 using the identity service 192. The system 100 may allow the seller 302 to interact with blockchain objects 108X and/or 108Y in state A to change its state. For example, the system 100 may provide a user interface 142 for the seller 302, generated using the contextual information in the configuration file 198 and the data repository 179. For example, the user interface may allow the seller 302 to modify the parameters of the offer such as the offer price.

After being deployed, blockchain objects 108X and/or 108Y-in state A may receive events (e.g., messages generated by the system 100) pertaining to interactions from the seller 302 and other allowed personas, such as the buyer 304, based on the current state (e.g., state A) of the blockchain objects 108X-A. In an example, the blockchain object 108X in state A may ignore messages from the inspector 306 or the appraiser 308 because the state of blockchain objects 108X and/or 108Y in state A does not allow a persona such as an appraiser 308 or the inspector 306 to alter the state or provide any inputs. For example, the code 109 executed by blockchain objects 108X and/or 108Y in state A determines to ignore those messages based on comparison to approved personas and state transitions from the current state that are derived from the action list and other information. Also, the system 100 may prevent such messages from being addressed to blockchain objects 108X and/or 108Y in state A if the appraiser 308 or the inspector 306 are attempting to interact with the blockchain object 108X and/or 108Y through the system 100, when the blockchain object 108X and/or 108Y is in state A. Similarly, the actions available to a persona such as a buyer 304 is also prescribed by the machine-readable instructions in the blockchain object 108X and/or 108Y.

Assume the current state of the deployed blockchain objects 108X and/or 108Y is state A and the buyer 304 logs into the system 100. The system 100 may authenticate the buyer 304 through the identity service 192. The system 100 may determine based on the participant contextual data stored in the off-chain storage 110 the persona of the buyer 304. The system 100 may allow the buyer 304 to interact with blockchain objects 108X and/or 108Y in state A to purchase the asset. This action of the buyer 304 is one of the acceptable actions in the action list 178 based on the current state. For example, the system 100 may present a user interface to the buyer 304 to receive the parameters of the conditional acceptance or counter-offer. The system 100 may use the configuration file 198 to determine the parameters for the blockchain object 108X and/or 108Y in state A that may change the state (e.g., acceptance of a conditional offer). The system 100 may determine the address 301 of the blockchain object (e.g., 0xBB9bc244D798123fDe783fCc1C72d3Bb8C189413) to send the message. For example, the system 100 may obtain the event (e.g., the blockchain object 108X and/or 108Y) through the blockchain monitor 122 or from off-chain storage 110. The system 100 may then deploy an event (e.g., a message addressed to the address 301) to blockchain objects 108X and/or 108Y through the blockchain service 188. The system 100 may use the private key 184 and public key 186 from the memory 103 and the identity service 192 to authenticate the participant (e.g., the buyer 304) on blockchains 120X and/or 120Y, sign the message to blockchain object 108X and/or 108Y in state A, and the like. The system 100 may use the hashing service 144 to hash the message for storage in the off-chain storage 110. In an example, the message may be a blockchain object. The system 100 may store the hash of the message and the message in the off-chain storage 110. The system 100 may deploy the message as an event on blockchains 120X and/or 120Y and include the address of blockchain objects 108X and/or 108Y to send the event (e.g., the message to the blockchain object 108X and/or 108Y) to blockchain objects 108X and/or 108Y. In an example, the event (e.g., a message to the blockchain object 108X and/or 108Y) may be a data object and may not include code.

In an example, the system 100 may track the blockchain object 108X and/or 108Y when the buyer 304 conditionally accepts the offer to purchase the asset subject to an inspection and/or an appraisal. The blockchain object 108X and/or 108Y, once it receives the message, may be executed by a node in a peer-to-peer network of nodes mining blockchains 120X and/or 120Y to arrive at a consensus. The node may execute the code 109X or 109Y in blockchain objects 108X and/or 108Y. The blockchain object 108X and/or 108Y in state A may change state from state A to state B. The blockchain object 108X-B and/or 108X-C may be deployed to blockchains 120X and/or 120Y in a new block and published to peers on the peer-to-peer network by the node. The blockchain object 108X-B and/or 108Y-B may then send a message to the seller 302. In an example, the code 109 may not include a state for conditional acceptance but may have an exception handling capability. The system 100 may receive the message from the blockchain object 108X-B and/or 108Y-B through the blockchain monitor 122. For example, the blockchain monitor 122 may retrieve new blocks on blockchains 120X and/or 120Y to identify messages that may be sent to a participant. In an example, a participant on the blockchain may be allocated a blockchain address. In another example, the blockchain monitor 122 may identify messages from the blockchain object 108X-B based on the signature of the blockchain object 108X-B or the signature in the event (e.g., message or object). The system 100 may then alert the seller 302 when the seller logs into the system 100 and the seller is detected through their username and password. The system 100 may receive parameters to address the exception through the user interface 142. The system 100 may then deploy an event (e.g., a message to the blockchain addressed to the blockchain object 108X-B and/or 108Y-B). The blockchain object 108X-B and/or 108Y-B may change state to state C based on the event. The blockchain objects 108X-B and/or 108Y-B may then be deployed as blockchain object 108X-C or 108Y-C on a new block of blockchains 120X and/or 120Y. At state C, the system 100 may allow the seller 302 to interact with the blockchain object 108X-C and/or 108Y-C and make an offer to an inspector 306 and/or an appraiser 308. The system 100 may transmit the offer to the blockchain object 108X-C and/or 108Y-C as an event (e.g., a message using the blockchain service 188). The blockchain object 108X-C and/or 108Y-C, once it receives the message, may wait for acceptance of the offer by an inspector 306 or appraiser 308. The appraiser 308 and/or inspector 306 may be required to provide the report to the buyer 304. In an example, the appraiser 308 and/or inspector 306 may provide the report to the blockchain object 108X-C and/or 108Y-C as a message and blockchain objects 108X-C and/or 108Y-C may then transition to state E. In another example, the system 100 may track actions of the appraiser 308 and/or inspector 306 and send a message to the blockchain object 108Y through the blockchain 120Y changing the state of the blockchain object 108X-D and/or 108Y-D to state E. The blockchain object 108X-E and/or 108Y-E may then be deployed on a new block of blockchains 120X and/or 120Y. The system 100 may obtain the block updates to blockchains 120X and/or 120Y periodically through the blockchain monitor 122. The blockchain monitor 122 may place the events (e.g., the appraisal and/or inspection completion) on the event stack 104. In an example, the event may be processed by the storage service 143 and stored on the off-chain storage 110.

The buyer 304 may use the user interface 142 to send an event to the blockchain with the consideration. For example, the buyer 304 may attach proof of the event through banking channels. In another example, the buyer 304 may use a cryptocurrency to perform the transaction. In another example, banks may provide confirmation hashes that may be deployed on the blockchain that may be secured using the public key of the blockchain object 108X-E and/or 108Y-E and may be verified by the blockchain object 108X-E and/or 108Y-E.

In an example, the system 100 may periodically update blockchains 120X and/or 120Y with details such as confirmation of a financial event such as transfer of money. The system 100 may receive the financial event confirmation from the other systems 107. The input service 115 may process the event and place the event on the event stack 104 for deployment to blockchains 120X and/or 120Y through the blockchain service 188. In an example, the system 100 may use the hashing service 144 and/or the signing service 148 to securely encrypt the confirmation message with the public key of blockchain objects 108X and/or 108Y to confirm receipt of consideration. The system 100 may thus generate, deploy and manage blockchain objects 108X and/or 108Y on the blockchain 120X and/or 108Y.

Figure 5:
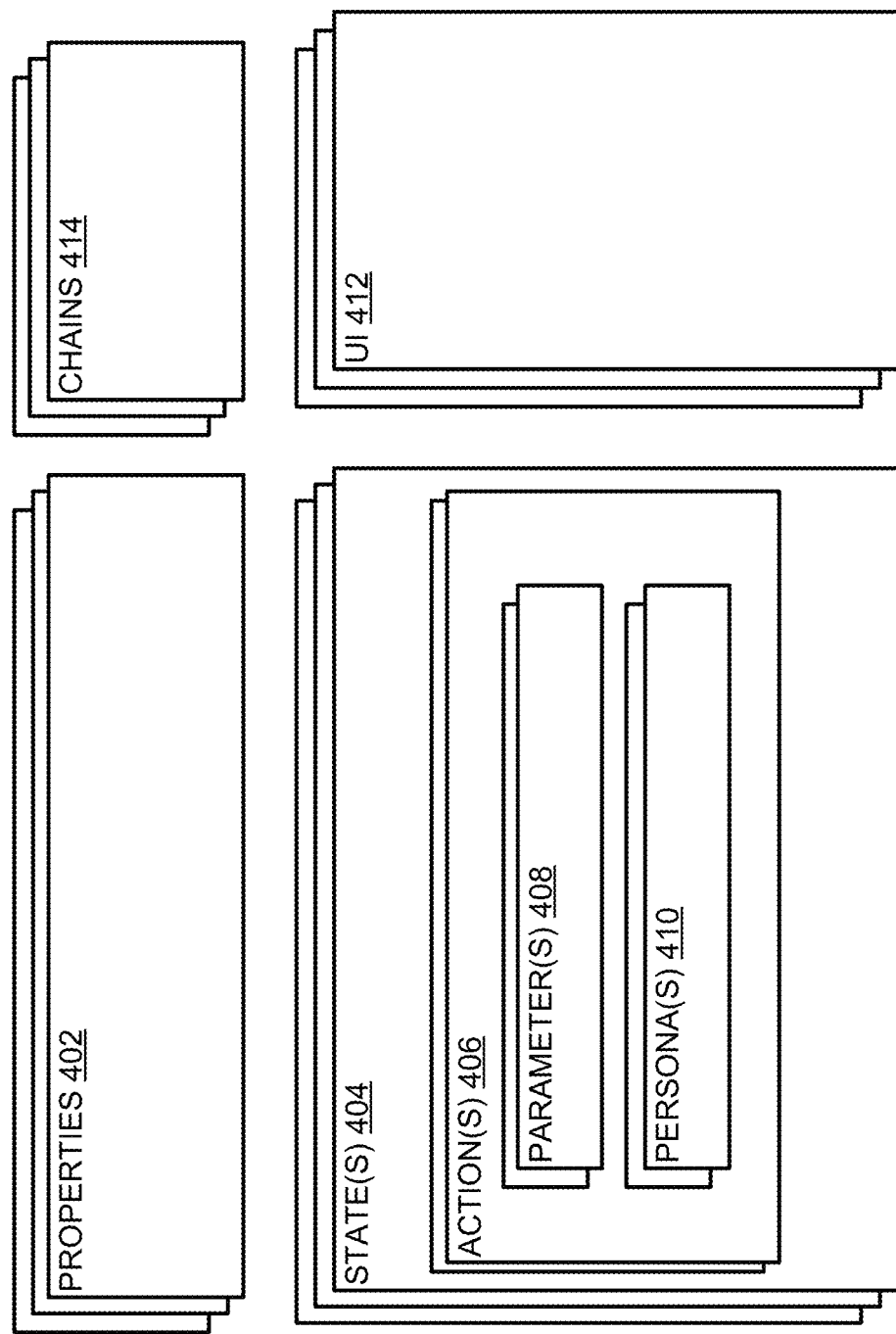
FIG. 5 shows a context schema, according to an embodiment of the present disclosure.

FIG. 5 shows an example of the context schema 196. For example, the context schema 196 includes properties 402 of blockchain objects 108X and/or 108Y. The properties 402 of the context schema 196 may correspond to the details of the configuration file 198 of blockchain objects 108X and/or 108Y. In an example, the configuration file 198 may include the state list 176 that may correspond to the states 404 in the context schema 196. Similarly, the action list 178 may correspond to the actions 406, the persona 171 may correspond to the persona 410, the blockchain id 174 that corresponds to the blockchain identifier 414, the parameter 175 that corresponds to the parameters 406 and the user interface 173 that corresponds to the user interface 412 of the configuration file 198 and the context schema 196 respectively.

For example, the blockchain identifier 414 may identify the blockchain where blockchain objects 108X and/or 108Y is/are deployed and the like. For example, the blockchain identifier 414 may be used to indicate the first blockchain 120X for the first blockchain object 108X. The value of the blockchain identifier 414 may be stored in the data repository 179. The system 100 may use the context schema 196 to generate the configuration file 198, which is an instance of the context schema 196 populated with types of the values for a particular blockchain object, such as blockchain objects 108X and/or 108Y and the values of the particular blockchain object may be stored in the data repository 179. In an example, the system 100 may generate a configuration file for each blockchain object that is deployed, managed and/or tracked.

In an example, the system 100 may use the context schema 196 to generate the configuration file 198 during deployment of the blockchain object 108. In another example, the system 100 may generate a configuration file for a blockchain object deployed on the blockchains 120X and/or 120Y by a third party. The system 100 may identify blockchain objects that were deployed by another system and pertain to a particular participant or another blockchain object being monitored by the system 100. The system 100 may then generate a configuration file describing the possible states of the blockchain object, the state transitions, and the actions of personas in specific states.

The configuration file 198 described below with reference to FIG. 6 may also include a state list of possible states of blockchain objects 108X and/or 108Y and may serve as a map to describe the past, present and future states of blockchain objects 108X and/or 108Y. The system 100 may retrieve the current state of blockchain objects 108X and/or 108Y from the data repository 179 using the configuration file 198 as a map and for providing additional context. The configuration file 198 may map possible states of blockchain objects 108X and/or 108Y to one or more participants, roles of participants, history of the other blockchain objects on the blockchain and the like. For example, the system 100 may use the configuration file 198 with the data repository 179 to determine the current state of blockchain objects 108X and/or 108Y, the actions available for the personas and the parameters of the actions, and possible states of blockchain objects 108X and/or 108Y based on a current state for particular participants.

The configuration file 198 (described below with reference to FIG. 6 below) or the context schema 196, may be used to generate GUIs in the user interface 142. For example, the configuration file 198 may be used to populate a GUI using the user interface generator 140 to display contextually accurate user interface from the UI list 173 to display event information for blockchain objects 108X and/or 108Y from the data repository 179. The GUIs generated based on the UI list 173 provide a mechanism for a participant to interact with blockchain objects 108X and/or 108Y. The system 100 may display a GUI in the user interface 142 for the participant to view contextual information about blockchain objects 108X and/or 108Y such as the parameters, the state, and personas that may interact with the blockchain object. For example, the system 100 may display a list of blockchain objects that are associated with the seller 302 shown in FIG. 4. The system 100 may similarly provide a list of blockchain objects that list an asset for sale irrespective of the identity of the seller. For example, the system 100 may determine a list of real estate sale offers on blockchains 120X and/or 120Y matching a search specification.

The system 100 may also use the configuration file 198 or the context schema 196 to provide context for other services. In an example, analytics services 132 may utilize the blockchain data stored in the off-chain storage 110 (e.g., the data repository 179) and the configuration file 198 for data modeling. The configuration file 198 provides context to the blockchain data. The blockchain data without the configuration file 198 may be a chronological list of events stored with other additions to provide immutable verification of the events. The blocks in the blockchain may contain random events grouped together based on time of arrival of the blockchain objects. In an example, a block in the blockchain may be populated with disparate events such as blockchain object deployments, a status change of blockchain objects 108X and/or 108Y (in FIG. 3), a message to another blockchain object on the blockchain, transfer of cryptocurrency between two participants, and the like. Subsequent updates to events on the blockchain such as updates to the state of blockchain objects 108X and/or 108Y (in FIG. 3) are populated in the next available block of the blockchain with other events that arrive close to each other. Thus, the blocks in the blockchain contain random events. The system 100 may provide access to blockchain objects 108X and/or 108Y with the contextual information from the configuration file 198. The configuration file 198 may thus be used as an index that allows retrieval of events that are otherwise distributed randomly in blockchains 120X and/or 120Y.

For example, the analytics service 132 may use the configuration file 198 and events in the off-chain storage 110 (e.g., the data repository 179) to transform the events in a blockchain for modeling. The analytics service 132 may retrieve the events from the off-chain storage 110 similar to the how the service handles other data for analytics. For example, the analytics service 132 may use the data repository 179 (e.g., SQL database) to store and retrieve events (e.g., transactions on blockchains 120X and/or 120Y) from blockchains 120X and/or 120Y. The analytics service 132 may also use the configuration file 198 to retrieve events for predictive model building and optimization. The configuration file 198 can provide a hierarchical relationship linking blockchain objects 108X and/or 108Y on blockchains 120X and/or 120Y to entities that have interacted with blockchain objects 108X and/or 108Y, possible entities who may interact with blockchain objects 108X and/or 108Y, possible interactions with blockchain objects 108X and/or 108Y, relationships between events on the blockchain, state of blockchain objects 108X and/or 108Y, past states of blockchain objects 108X and/or 108Y and possible future states of blockchain objects 108X and/or 108Y. For example, the configuration file 198 can provide a hierarchical index for an event on the blockchain, linking the event with entities in the real world, the interactions of the participant in other related events, constraints on the real world participant in future related events, entities that may interact with the event in the future and their degrees of freedom in the interaction and the like. This index can be used to retrieve relevant information for analytics.

In an example, the off-chain storage 110 includes the data repository 179 to store values of parameters described in the configuration file 198. The analytics service 132 retrieves events from the data repository 179 for model building, and groups the events according to persona, role or the like. The analytics service 132 may also combine the events in the off-chain storage 110 with other sets of data such as profile data of consumers for model building.

In an example, the system 100 may use the analytics service 132 to identify products or services a customer is interested in based on the events stored on the blockchains 120X and/or 120Y. The system 100 may then combine this information with the browsing history of the customer. Thus, the system 100 may provide services to allow businesses to track their customer base better, identify potential customers and allow targeted advertising to potential customers.

In an example, the off-chain storage 110 may organize events using the configuration file 198 before storing them in the off-chain storage 110. For example, the off-chain storage 110 may store events related to the same persona under the same classification. The off-chain storage 110 may store related data together instead of chronologically. The analytics service 132 may use the context to transform and model the data.

The system may use the context schema 196 to determine the constraints on the blockchain object. For example, the context schema may specify who, when, where, what, why and how for interactions with the blockchain object. In an example, the system may store a configuration file 198, an instance of the context schema 196 for each blockchain object. The system may use the context schema 196 to determine the persona type who may act on the blockchain object. In an example, the context schema 196 may describe a hierarchy of blockchain object, state, action, persona, role and other contextual information along with the history of the event. The system may use an instance of the context schema, i.e., a configuration file for each blockchain object.

FIG. 6 shows an example of code 109X and/or 109Y of the blockchain object 108X and/or 108Y. The example also shows the corresponding configuration file 198. In an example, the system 100 may create the configuration file 198 as an instance of the context schema 196 during deployment, based on the inputs received from the user through the user interface 142.

The configuration file 198 may describe the personas of blockchain objects 108X and/or 108Y present in the code 109 shown on the left-hand side of the FIG. 6. In an example, in blockchain objects 108X and/or 108Y the personas the seller 302, the buyer 304, the inspector 306 and the appraiser 308 are defined in the code 109X and/or 109Y. Similarly, in the configuration file 198, the types of the personas the seller 302, the buyer 304, the inspector 306 and the appraiser 308 are described as "user".

Also code 109X and/or 109Y of blockchain object 108X and/or 108Y shows a state of the blockchain objects in the code. Similarly, the configuration file 198 provides a map of the states. As described above with reference to FIG. 4 and FIG. 4B, blockchain objects 108X and/or 108Y may transition between six different states before the conclusion of the sale of the asset. The configuration file 198 may provide the list of all transitions possible until the conclusion of the sale of the asset.

The configuration file 198 may have the state list 176 including the possible states for the transfer of an asset shown in FIG. 4. The state list 176 includes a mapping such as all possible states from state A through state F. As described above with reference to FIG. 4; state A depicts an offer for sale of the asset from seller 302 to buyer 304. State B is a conditional acceptance subject to inspection, from the buyer 304 to the seller 302. State C is a request for inspection from the seller 302 to an inspector 306 or a request for appraisal from the seller 302 to an appraiser 308 and acceptance of the request by the inspector 306. State D is delivery of an inspection report to the buyer 304. State E is a transfer of consideration from the buyer 304 to the seller 302. State F is a completed sale of the asset. In addition to the states A to F described above, the blockchain object may include additional states such as created, active, terminated, completed, inspected and appraised as shown in state mapping 610.

Similarly, the configuration file includes the parameters for each of the actions of personas in each of the states. For example, in the state created and active, the parameter may be an asking price 606 of type "money." In an example, the persona initiating blockchain object 108X and/or 108Y may be the seller 302 as described above with reference to FIG. 4. The persona seller 302, may during the state created and active be required to provide the parameter asking price 606. In an example, the asking price 606 may be in United States Dollars (USD), in a cryptocurrency (e.g., Bitcoin™) or the like. The system 100 may receive the information and store the information in the data repository 179 as described above with reference to FIG. 1. The blockchain object 108X and/or 108Y may be initialized with the asking price 606. The system 100 may also store the initial state of blockchain object 108X and/or 108Y the state 602. The system 100 may after initializing the state change the state from created to active. 1

Other examples of the parameters may include an offer price 606, in the state counter-offer from buyer 304 to seller 302. The type of the offer price 608 may be money. In an example, the buyer 304 may send a message (e.g., a message blockchain object with the offer price 606 addressed to blockchain objects 108X and/or 108Y) and deploy the message to blockchains 120X and/or 120Y. The personas that may interact with the deployed blockchain object may include the seller 302, the buyer 304, the inspector 306 and the appraiser 308. The offer from the persona buyer 304 may include an offer price 608 with the type money.

In an example, one or more of the entities, such as the buyer 304, the inspector 306 and/or the appraiser 308, may interact with blockchain objects 108X and/or 108Y and blockchains 120X and/or 120Y directly without using the system 100. The blockchain monitor 122 may determine the changes in the blockchain update or new blocks of the blockchain to determine whether blockchain objects 108X and/or 108Y has changed state or if there is a message blockchain object that addresses blockchain objects 108X and/or 108Y in the new block of blockchains 120X and/or 120Y. The configuration file 198 may allow the participant to identify the types of each of the parameters such as the action list 178 (not shown in FIG. 6, but shown in FIG. 1), the state list 176 and the like and obtain contextual information. In an example, the initial values and the intermediate values of blockchain objects 108X and/or 108Y may be stored in the data repository 179 (shown in FIG. 1).

Figure 7:
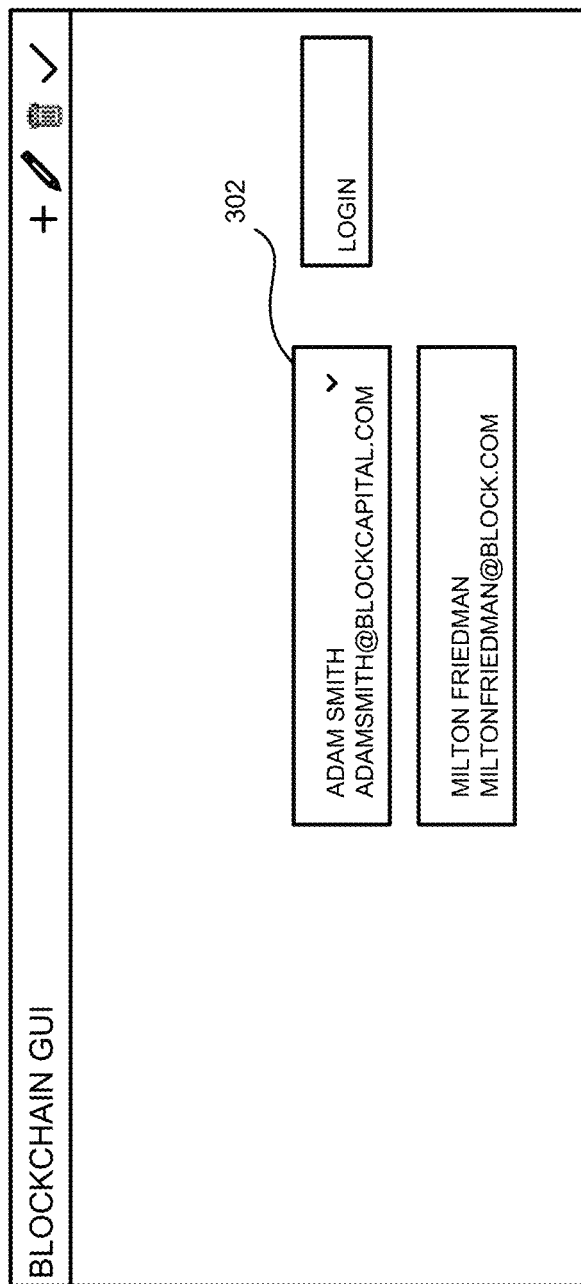

FIGS. 7-9 show examples of GUIs that may be generated by the user interface generator 140 in the user interface 142. FIG. 7 shows a login screen presented to a participant who is not logged in. A participant may log in to the system 100 with a username and password as discussed above. The system 100 may associate the username and password of the participant as described above with the contextual information stored in data repository 179 using the information in the configuration file 198. The identity service 192 may identify the participant's off-chain identity and the participant's blockchain identity. In an example, the participant's off-chain identity may be the private key 184 and the public key 186 of the participant. In another example, the identity service 192 may during the creation of a username receive the private key 184, public key 186, the role 172 and the persona 171 of the participant. The system 100 may use this contextual information to display the appropriate user interface once the participant is authenticated by the system 100. In an example, the use of a single sign in that links the off-chain identity of the participant and the blockchain identity of the participant permit authentication of the participant and revocation of the participant's credentials on both the blockchain and the system 100. This may prevent misuse of the public key 186 and/or the private key 184 once the participant no longer has appropriate access credentials or the credentials are revoked. For example, a manager in a car sales dealership may retire, and the credentials may be revoked after retirement.

A GUI shown in FIG. 8 may display actions 778 for a participant after the participant logs in. Also, the system 100 may display the participants interacting with blockchain objects 108X and/or 108Y. For example, the participants 771 interacting with the blockchain object for sale of an asset are the seller 302 (e.g., owner of the car), the buyer 304 of the car, the inspector 306 of the car and the appraiser 398 of the car as discussed above with reference to FIG. 4. This information may be determined based on information in the configuration file 198. The system 100 may use the identity service 192 to identify the off-chain identity of the seller 302. For example, as discussed above with reference to FIG. 3, the system 100 may use the credential of the seller such as the email address, mac address and/or unique identifier of the seller 302 with the off-chain identity such as name and image of the seller 302. In another example, assume the buyer 304 is not using the system 100. The system 100 may obtain the public key when the buyer 304 makes an offer through a message blockchain object addressed to blockchain objects 108X and/or 108Y. The system 100 may then retrieve the name associated with the cryptographic signature used on the message blockchain object. For example, the public key may be stored in a trusted key database on a network such as the internet. In an example, the system 100 may retrieve the first name and last name of the seller 302, store the information in the data repository 179 on the off-chain storage 110. The system 100 may similarly include the information for the inspector and the appraiser. As shown in FIG. 8, the images of the buyer, inspector and the appraiser may not be available because they may not be using the system 100 and the image may not be available in a public repository.

In an example, the user interface generator 140 may request the current state of blockchain objects 108X and/or 108Y. The blockchain oracle 146 may retrieve the information from the off-chain storage 110 based on the context schema 196 or the configuration file 198. The user interface generator 140 may then present the participant with the state information 712 as shown. The user interface generator 140 may also generate the list of actions 778 available such as reject, terminate and accept the offer as shown, that correspond to the action list 178 in the configuration file 198 for the current state 712. The system 100 may also present the participant (e.g., seller 302) with information or description 702 of the asset. The system 100 may generate this information based on the contextual information provided by the context schema 196.

Figure 9A:
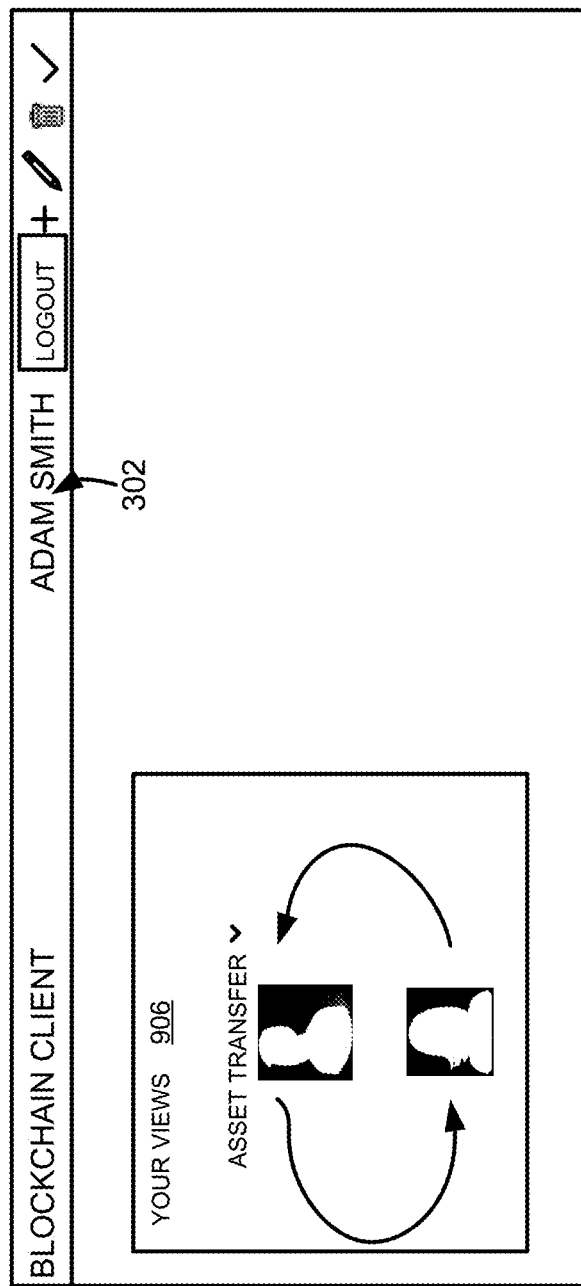

The system 100 may generate the user interface 142 shown in FIGS. 9A-B based on one or more blockchain objects. FIG. 9A shows a GUI of participants that are interacting or that may interact with the blockchain object 108. FIG. 9B shows a GUI displaying all the asset transfers by an entity such as a car dealership. In an example, assume participants using the system 100 may be employees of a car dealership. The system 100 may generate a comprehensive view of the state of each blockchain object the employees are interacting with, the state of the blockchain object, description of the blockchain object, the asking price of an asset, the offer price if any, the buyer of the asset and the like on a single screen. The user interface shown in FIG. 9B may, for example, be triggered by using the interface shown in FIG. 9A. The system 100 may determine the details of the blockchain objects deployed on blockchains 120X and/or 120Y from the off-chain storage 110 and the configuration file 198. A notifications interface 902 may retrieve events from the event stack 104 to show events received from the blockchain monitor 122 for objects in the assets list 904.

Methods according to embodiments of the present disclosure are described below. The methods are described as being performed by the system 100, such as the system 100 shown in FIG. 3, but the methods may be performed by other systems. The methods and operations described herein may be performed by one or more servers or other types of computers including at least one processor executing machine-readable instructions stored on a non-transitory computer readable medium. Also, one or more of the steps of the methods may be performed in a different order than shown or substantially simultaneously.

Figure 10:
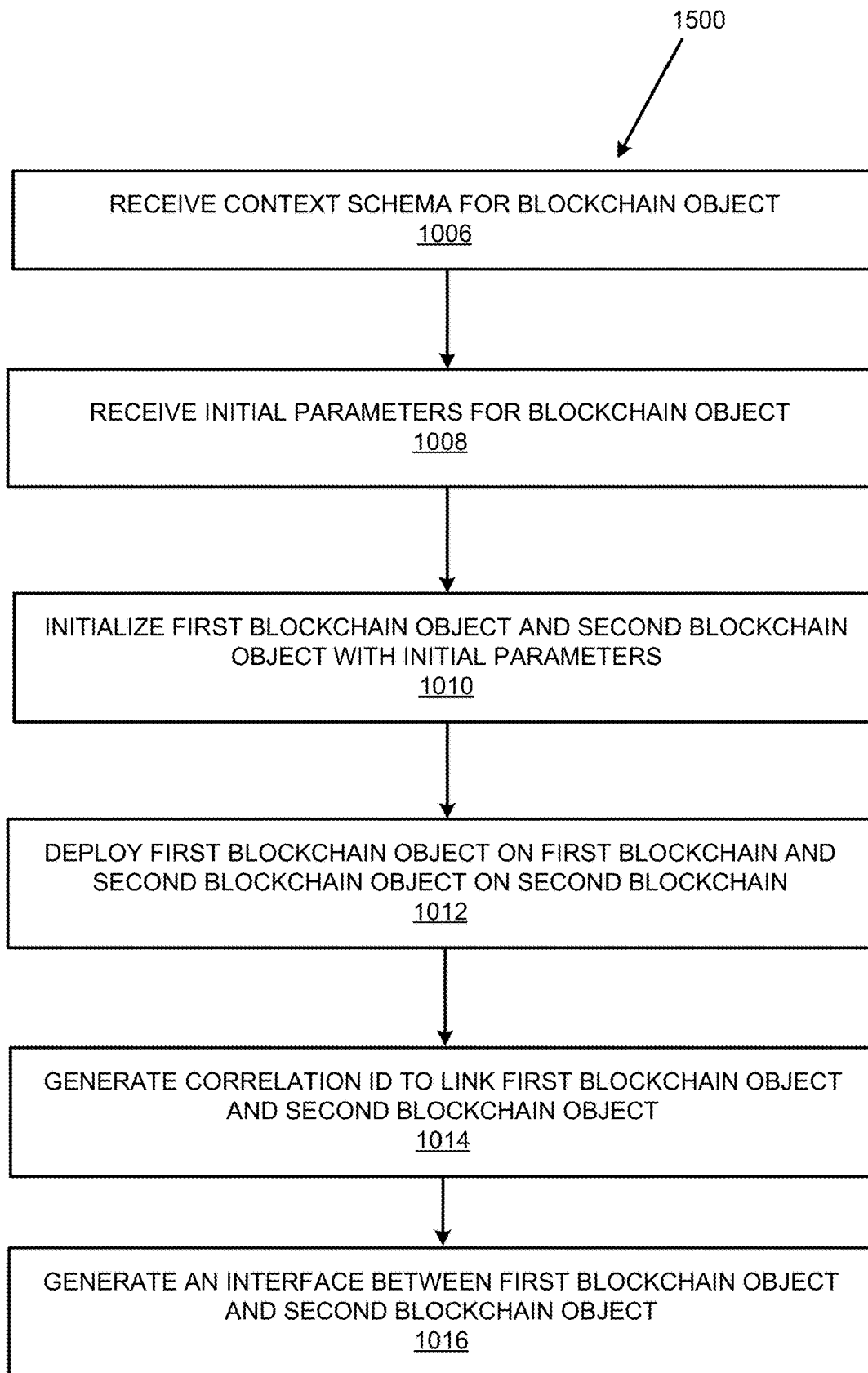
FIGS. 10-12 show examples of methods, according to embodiments of the present disclosure.

FIG. 10 shows an example of a method 1000 for generating an interface between the first blockchain object on the first blockchain and the second blockchain object on the second blockchain via the event stack 104.

At block 1006, the system 100 may receive a context schema for a blockchain object such as the first blockchain object 108X and/or the second blockchain object 108Y as described above with reference to FIG. 3. As described in FIG. 3 above, the context schema 196 may be stored in the memory 103. In an example, the context schema 196 may include a state list with a set of possible transitions from each state (i.e., state map) and a persona list of acceptable personas who may interact with the blockchain object for each state. Also, context schema 196 may include a set of actions or an actions list listing all the actions available to the participant. The actions on the actions list may request parameters. The system 100 may determine the type for each of the parameters in the context schema 196. In an example, the context schema 196 may also include a set of graphical user interface items that may be used based on the context and the information in the state list, action list, persona and role of the participant. In an example, the system 100 may generate an instance of the context schema 196 as a configuration file 198. The configuration file 198 as shown in FIG. 3 may include the persona 171, role 172, state list 176, action list 178 and the like.

At block 1008, the user interface generator 140 may receive initial parameters for generating blockchain objects 108X and/or 108Y. For example, the system 100 may use the configuration file 198 to determine the parameters in the actions list 178 corresponding to the initial state in the state list 176. The user interface generator 140 may determine the user interface based on the context schema 196 and the contextual information, i.e., the initial state parameter to be requested. The user interface generator 140 may present the user interface 142 to the participant to receive the initial parameter. The user interface generator 140 may receive the initial parameters for the blockchain object and process the initial parameter through the API 106. The response may be placed on the event stack 104 as an event for other services on the system 100. For example, assume blockchain object 108X and/or 108Y is for sale of an asset.

At block 1010, the system 100 may initialize the first blockchain object 108X and second blockchain object 108Y with the received initial parameters based on the context schema 196. In another example, the system 100 may use the information available from the off-chain storage 110 to populate the initial parameter. In an example, the instructions to initialize the second blockchain object 108Y may generate a hash of the first blockchain object 108X to use as the second blockchain object 108Y.

In another example, the first blockchain object 108X may be compatible with a specific blockchain. For example, the first blockchain object 108X may be compatible with the Etherium blockchain. In another example, the second blockchain object 108Y may be compatible with Neo™. The system 100 may use similar machine-readable instructions that are functionally the same for the first blockchain object 108X and the second blockchain object 108Y. For example, as described above with reference to FIG. 1 the first blockchain object 108X and the second blockchain object 108Y may use different languages.

At block 1012, the system 100 deploys the first blockchain object 108X to the first blockchain 120X and the second blockchain object 108Y to the second blockchain 120Y. As described above with reference to FIG. 3, the blockchain service 188 may deploy the first blockchain object 108X and the second blockchain object 108Y to the first blockchain 120X and the second blockchain 120Y respectively. At block 1014, the system 100 may generate the correlation id 162 that links the first blockchain object 108X and the second blockchain object 108Y. In an example, the correlation id 162 may include the cryptographic signature of the first blockchain object 108X and the cryptographic signature of the second blockchain object 108Y. The system 100 may store the correlation id 162 in the data repository 179 on the off-chain storage 110.

At block 1016, the system 100 may generate an interface between the first blockchain object 108X and the second blockchain object 108Y via the event stack 104. As described above with reference to FIG. 3, the blockchain monitor 122 and the blockchain service 188 may monitor the block updates on the first blockchain 120X and/or the second blockchain 120Y to generate an interface between the first blockchain object 108X and the second blockchain object 108Y. The blockchain service 188 may deploy a message addressed to a blockchain object on the blockchain 120X and/or 102Y. The blockchain monitor 122 may scan for changes in the block updates received from blockchains 120X and/or 120Y. These two services may serve as an interface allowing for two-way exchange of information between the system 100 and blockchain object 108X and/or 108Y.

In an example, as discussed above with reference to FIG. 3, the system 100 may initialize blockchain objects 108X and/or 108Y with the initial parameter by including code 109X and/or 109Y (e.g., machine-readable instructions executable on blockchains 120X and/or 120Y). The code 109X and/or 109Y may include machine-readable instructions relating to the master-master, master-slave, slave-slave configuration as discussed above with reference to FIG. 4. For example, the code 109X may include instructions to delay a change of state of the first blockchain object 108X until a message is received confirming the change of state of the second blockchain object 108Y. In an example, the system 100 may act as a mater and the first blockchain object 108X and the second blockchain object 108Y may serve as slaves. In another example, one of the blockchain objects 108X or 108Y may serve as the master while the other serves as a slave. In an example, the slave may change state only after confirmation of the change of state of the master. In an example, the system 100 may deploy a hash instead of the first blockchain object 108X on the second blockchain 120Y. The system 100 may then serve as a synchronizing service between the master first blockchain object 108X and the slave hash (e.g., the hash of 108X deployed as the second blockchain object 108Y on the second blockchain 120Y) deployed on the second blockchain 120Y. In an example, in response to a determination that the state of the first blockchain object changed, the system 100 may generate a message directed to the second blockchain object. For example, the system 100 may deploy an updated has to the second blockchain 120Y. Thus, the system may use a hash to synchronize the first blockchain object 108X and the second blockchain object 108Y, where the second blockchain object 108Y may be a hash deployed on a blockchain that does not support smart contracts. In another example, the second blockchain object 108Y may be the same as the first blockchain object 108X. For example, the second blockchain 120Y may not support the first blockchain object 108X but may allow a blob such as the first blockchain object 108Y to be stored as part of a transaction. The system 100, may track objects on the block update to find references to the address of the hash deployed on the second blockchain 120Y.

Figure 11:
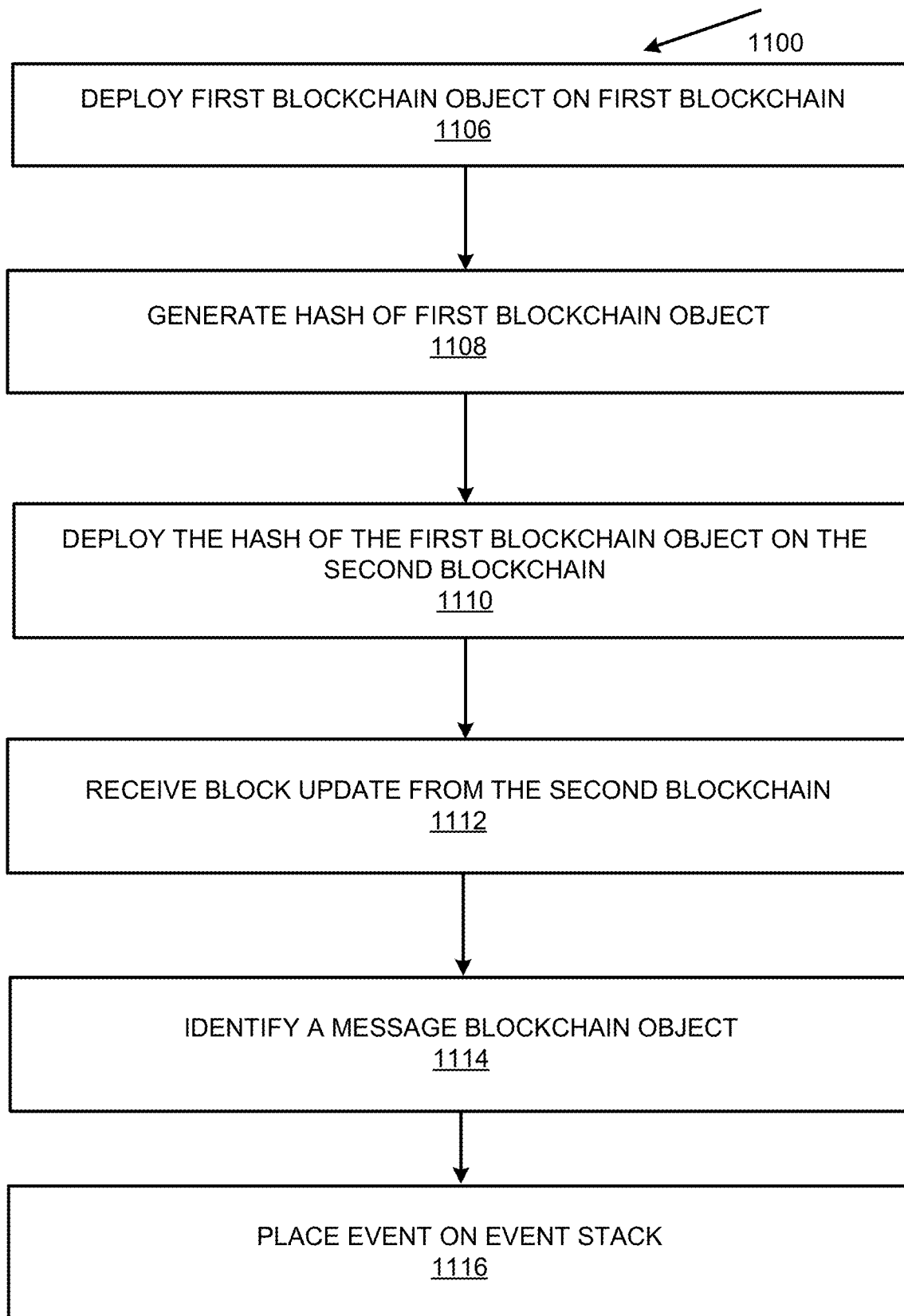
Figure 12:
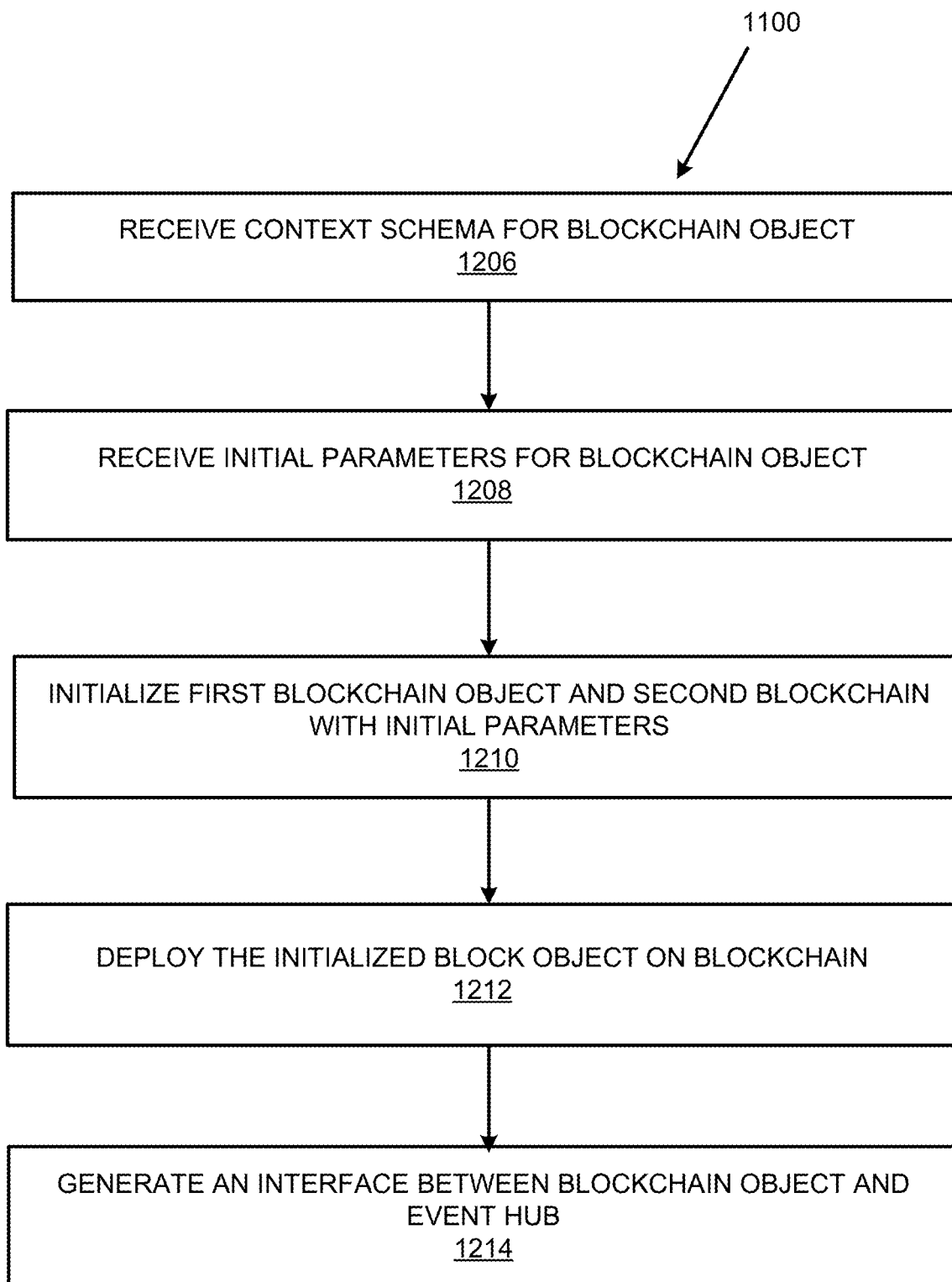

FIG. 11 shows an example of a method 1100 for deploying the same blockchain object on two different blockchains. At block 1106, the system 100 may deploy a first blockchain object 108X on a first blockchain 120X. As described above with reference to FIG. 3, the blockchain service 188 may be used to deploy the first blockchain object 108X on the first blockchain 120X.

At block 1108, the system 100 may generate a hash of the first blockchain object 108X using the hashing service 144 as described above with reference to FIG. 1. In an example, the hashing service 144 may generate a hash of the first blockchain object 108X with the initial state of the first blockchain object 108X.

At block 1010, the system 100 may deploy the hash of the first blockchain object 108X on the second blockchain 120Y. In an example, the system 100 may use the blockchain service 188 to deploy the hash of the first blockchain object 108X on the second blockchain 120Y. For example, the hash of the first blockchain object 108X may be deployed on a blockchain that does not support the first blockchain object 108X. In an example, the bitcoin blockchain does not support smart contracts. The system 100 may deploy a hash of the first blockchain object 108X as a URL in a transaction on the bitcoin blockchain. In another example, the system 100 may deploy the hash of the blockchain object 108X on the second blockchain 120Y.

At block 1112, the system 100 may receive a block update from the second blockchain 120Y. The blockchain monitor 122 may determine a plurality of events in the block update or the new block. In an example, each object received from the second blockchain 120Y in the block update may be placed as an event on the event stack 104. In an example, the events received from the block update may include objects (e.g., transactions) that may not be of interest to the participants using the system 100 along with objects that may be of interest to the participants using the system 100. The system 100 may use the input service 115 or the blockchain monitor 122 to filter out the events of interest to the participants in the system 100. In an example, the system 100 may store all events received from the second blockchain 120Y in the off-chain storage 110 for providing additional services.

The storage service 143 may use the hashing service to generate a hash 170 for the blockchain object it stores. The storage service 143 may also store each blockchain object with its hash. In an example, the system 100 may store each blockchain object with its configuration file 198. In addition, the parameters of the blockchain object may be stored in the off-chain storage 110 (e.g., in the data repository 179).

At block 1114, the system 100 may determine whether a message blockchain object addressed the second blockchain in the block update. For example, the system 100 may determine from the plurality of events placed on the event stack 104 whether a message blockchain object was addressed to the unique address of the hash deployed on the second blockchain 120Y.

At block 1116, the system 100 may place an event on the event stack 104 based on the message blockchain object. For example, the blockchain monitor 122 may determine that a message blockchain object addresses the hash (e.g., second blockchain object 108Y) deployed on the second blockchain 120Y.

In an example, the input service 115 may then determine the context of the addressing of the hash on the second blockchain 120Y. The input service 115 may determine the context of addressing based on the configuration file 198. For example, assume the first blockchain object 108X is in the initial state in an asset transfer. The system 100 may use the configuration file 198 to determine the next possible state or states for the blockchain object 108X, the persona that may interact with the first blockchain object 108X. Then the system 100 may determine whether the message blockchain object was received from an appropriate persona, in the current state and the like. Thus, the system 100 may determine the actions available to a participant based on the current state and the configuration file 198.

FIG. 15 shows an example of a method 1200 for receiving the initial parameters of blockchain objects 108X and/or 108Y such as a blockchain object using the context schema 196 and generating an interface between the deployed first blockchain object 108X and the second blockchain object 108Y via the event stack 104. At block 1206, the system 100 may receive a context schema for a blockchain object. As described in FIG. 3 above, the context schema 196 may be stored in the memory 103. In an example, the context schema 196 may include a state list with a set of possible transitions from each state (i.e., state map) and a persona list of acceptable personas who may interact with the blockchain object for each state. Also, context schema 196 may include a set of actions or an actions list listing all the actions available to the participant. The actions on the actions list may request parameters. The system 100 may determine the type for each of the parameters in the context schema 196. In an example, the context schema 196 may also include a set of graphical user interface items that may be used based on the context and the information in the state list, action list, persona and role of the participant. In an example, the system 100 may generate an instance of the context schema 196 as a configuration file 198. The configuration file 198 as shown in FIG. 3 may include the persona 171, role 172, state list 176, action list 178 and the like.

At block 1208, the user generator 140 may receive initial parameters for generating blockchain objects 108X and/or 108Y. For example, the system 100 may use the configuration file 198 to determine the parameters in the actions list 178 corresponding to the initial state in the state list 176. The user interface generator 140 may determine the user interface based on the context schema 196 and the contextual information, i.e., the initial state parameter to be requested. The user interface generator 140 may present the user interface 142 to the participant to receive the initial parameter. The user interface generator 140 may receive the initial parameters for the blockchain object and process the initial parameter through the API 106. The response may be placed on the event stack 104 as an event for other services on the system 100. For example, assume blockchain objects 108X and/or 108Y is for sale of an asset.

At block 1210, the system 100 may initialize the first blockchain object 108X and/or the second blockchain 108Y with the received initial parameters based on the context schema 196. In another example, the system 100 may use the information available from the off-chain storage 110 to populate the initial parameter.

At block 1212, the system 100 may deploy the first blockchain object 108X and/or the blockchain object 108Y to the blockchain 120X and/or 120Y. As described above with reference to FIG. 3, the blockchain service 188 may deploy the first blockchain object 108X and the second blockchain object 108Y to the blockchain 120X and the blockchain 120Y respectively.

At block 1214, the system 100 may generate an interface between the blockchain object 108X and the second blockchain object 108Y via the event stack 104. As described above with reference to FIG. 3, the blockchain monitor 122 and the blockchain service 188 may generate an interface. The blockchain service 188 may deploy a message addressed to the blockchain object on the blockchains 120X and/or 120Y. The blockchain monitor 122 may scan for changes in the block updates. These two services may serve as an interface allowing for a two-way exchange of information between the system 100 and blockchain objects 108X and/or 108Y. In an example, the system 100 may use a correlation id 162 to link the first blockchain object 108X and the second blockchain object 108Y.

In an example, the correlation id 162 may describe the blockchain of the correlated blockchain objects, the block where blockchain objects 108X and/or 108Y are stored. In another example, the correlation id 162 may include information such as the master-master, master-slave relationship between the first blockchain object 108X and the second blockchain object 108Y as described above with reference to FIG. 4.

In an example, the blockchain monitor 122 may obtain a stock update from the from the first blockchain 120X and/or the second blockchain 120Y. The system 100 may determine whether the state of the first blockchain object 108X has changed based on the state map. For example, the state map may inform the system 100 of the context of blockchain object 108X and/or 108Y. In another example, the system 100 may determine the current state and the possible actions based on the state map.

In response to a determination that the state of the first blockchain object has changed the system 100 may generate a message blockchain object addressed to the second blockchain object to synchronize the state of the second blockchain object 108X on the first blockchain 120X with the state of the first blockchain object 108Y on the second blockchain 120Y. For example, a participant may interact with the correlated blockchain objects 108X and/or 108Y on one of the blockchains 120X and/or 120Y. The system 100 may then keep the correlated blockchain objects synchronized. The blockchain monitor 122 may place an event on the event stack 104 with the change of state. The input service 115 may determine the change of state of the blockchain object 108X and identify the correlated blockchain object 108Y. The system 100 may query the off-chain storage 110 to identify the correlation id 162 and then determine the identity of the blockchain 120Y where the second blockchain object is stored. The system 100 may then generate a message blockchain object addressed to the second blockchain object 108Y deployed on the second blockchain 120Y. The blockchain service 188 may deploy the second blockchain object 108Y to the second blockchain 120Y. In an example, the system 100 may deploy the first blockchain object 108Y on the second blockchain 120Y.

In an example, the system 100 may determine whether the state of a blockchain object 108X has changed based on the state map. In an example, in response to a determination that the state of the first blockchain object has changed the system 100 may determine the persona associated with the first blockchain object 108X. For example, the persona may be a persona allowed to interact with the blockchain object 108Y in the current state. The system 100 may determine whether the determined persona is associated with the second blockchain 120Y. For example, the system 100 may determine whether an inspector is associated with the second blockchain as described above with reference to FIG. 4. The system 100 may then generate a message blockchain object that is compatible with the second blockchain specifications. The system 100 may then deploy the message blockchain to the blockchains 120X and/or 120Y.

In an example, the first blockchain 120X and the second blockchain 120Y may be private blockchains. In another example, the second blockchain 120Y and the first blockchain 120X may be public blockchain. In another example, one of the first blockchain 120X and the second blockchain 120Y may be a combination of a private and/or public blockchain.

Although described with reference to blockchain object 108X and/or 108Y, the system 100 may monitor thousands of blockchain objects and events that may affect these objects on multiple blockchains, with multiple participants.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A blockchain object event interface system comprising:
   a hardware processor; and
   a computer readable medium storing machine-readable instructions that when executed by the processor cause the processor to:
   receive an initial parameter for a blockchain object based on a parameter specification in a context schema;
   create a first blockchain object with the initial parameter to deploy the first blockchain object on a first blockchain, and create a second blockchain object with the initial parameter to deploy the second blockchain object on a second blockchain different than the first blockchain,
   wherein to create the first and second blockchain objects, the processor is to:
   determine specifications, including a programming language, for each of the first and second blockchains;
   generate the first blockchain object, including first machine readable instructions in a first programming language specified in the specifications; and
   generate the second blockchain object, including second machine readable instructions in a second programming language specified in the specifications, wherein the second programming language is different than the first programming language;
   deploy the first blockchain object to the first blockchain and the second blockchain object to the second blockchain;

generate a correlation id, different than the initial parameter, to link the first blockchain object and the second blockchain object;
generate an interface between the first blockchain object and the second blockchain object via an event stack;
receive a block update from the first blockchain;
determine a plurality of events in the block update;
determine whether an event of the plurality of events affects the first blockchain object or the second blockchain object;
responsive to determining the event affects the first blockchain object or the second blockchain object, identify the second blockchain object based on the correlation id; and
generate a message to deploy to the second blockchain object via the interface based on the event.

2. The system according to claim 1, wherein the machine-readable instructions are executed by the processor to:
receive another block update from the first blockchain;
determine whether a state of the first blockchain object changed in the another block update;
in response to a determination that the state of the first blockchain object changed, store the state as an event in the event stack;
determine the correlation id associated with the first blockchain object;
generate a second message addressed to the second blockchain object to synchronize a state of the second blockchain object with the state of the first blockchain object; and
deploy the second message to the second blockchain to change the state of the second blockchain via the interface.

3. The system according to claim 1, wherein the machine-readable instructions to initialize a second blockchain object with the initial parameter are executed by the processor to:
generate a hash of the first blockchain object.

4. The system according to claim 3, wherein the machine-readable instructions are executed by the processor to:
receive a block update from the second blockchain;
determine whether a message blockchain object addressed to the second blockchain object is deployed on the second blockchain;
in response to a determination that message blockchain object is deployed on the second blockchain, store an event in the event stack;
determine the correlation id associated with the second blockchain object; and
deploy the message blockchain object to the first blockchain addressed to the first blockchain.

5. The system according to claim 4, wherein the machine-readable instructions are executed by the processor to:
receive another block update from the first blockchain;
determine whether a state of the first blockchain object changed in the another block update in response to the message blockchain object;
in response to a determination that the state of the first blockchain object changed, generate an updated hash of the second blockchain object in its changed state; and
deploy the updated hash to the first blockchain.

6. The system according to claim 1, wherein the first blockchain object and/or the second blockchain object is a cryptlet that is executed in a secure enclave instead of on all peers on a peer-to-peer network.

7. The system according to claim 1, wherein the first blockchain is a private blockchain and the second blockchain is a public blockchain.

8. The system according to claim 1, wherein the first blockchain and the second blockchain are private blockchains.

9. The system according to claim 1, wherein the first machine-readable instructions in the first blockchain object delay change of state until a message is received confirming the change of state of the second blockchain object is received to synchronize changes to the first blockchain object and the second blockchain object.

10. The system according to claim 1, wherein the first machine-readable instructions in the first blockchain object act as a master in a transaction, where all changes of state are authenticated by the first blockchain object before a corresponding change to state of the second blockchain object.

11. The system according to claim 1, wherein the first blockchain object is a smart contract.

12. An event interface system comprising:
a hardware processor; and
a computer readable medium storing machine-readable instructions that when executed by the processor cause the processor to:
determine a specification, including a programming language, for each of a first blockchain and a second blockchain;
generate a first blockchain object, including first machine readable instructions in a first programming language specified in the specification for the first blockchain;
generate a second blockchain object, including second machine readable instructions in a second programming language specified in the specification for the second blockchain, wherein the second programming language is different than the first programming language;
deploy the first blockchain object on the first blockchain;
deploy the second blockchain object on the second blockchain;
store a correlation id to link the first blockchain object and the second blockchain object;
receive a block update from the second blockchain;
determine whether an event in the block update affects the first blockchain object;
responsive to determining the event affects the first blockchain object, identify the first blockchain object based on the correlation id; and
generate a message to deploy to the first blockchain object based on the event.

13. The system according to claim 12, wherein the machine-readable instructions are executed by the processor to:
generate a hash of the first blockchain object;
deploy the hash of the first blockchain object on the second blockchain;
identify, from the received block update, a message blockchain object addressed to the deployed hash;
determine a context of addressing of the hash by the message blockchain object on the first blockchain;
generate a message addressed to the first blockchain object on the first blockchain based on the determined context; and
deploy the message blockchain object to the first blockchain.

14. The system according to claim 12, deploy the message to the second blockchain object on the second blockchain to synchronize the first blockchain object and the second blockchain object.

15. The system according to claim 12, wherein the first blockchain is a private blockchain and the second blockchain is a public blockchain.

16. The system according to claim 12, wherein the first blockchain object is a cryptlet that is executed in a secure enclave instead of on all peers on a peer-to-peer network.

17. A computer-implemented method for interfacing with blockchains, the method comprising:
  storing a context schema for a blockchain object, wherein the context schema comprises:
    a state map describing acceptable states of the blockchain object; and
    a persona list of acceptable personas of participants that are approved to interact with the blockchain object in different states described in the state map;
  determining a specification, including a programming language, for each of a first blockchain and a second blockchain;
  generating a first blockchain object, including first machine readable instructions in a first programming language specified in the specification for the first blockchain;
  generate a second blockchain object, including second machine readable instructions in a second programming language specified in the specification for the second blockchain, wherein the second programming language is different than the first programming language;
  deploying the first blockchain object to the first blockchain;
  deploying the second blockchain object to the second blockchain;
  receiving a block update from the first blockchain;
  determining a state of the first blockchain object has changed based on the block update and the state map;
  determining a persona associated with the changed state of the first blockchain object; and
  generating a message to deploy to the second blockchain in response to determining that the determined persona is associated with the second blockchain and that the determined persona is an acceptable persona based on the persona list and the changed state of the first blockchain object.

18. The computer-implemented method according to claim 17, the method comprising:
  generating a correlation id to interface the first blockchain object and the second blockchain object.

19. The computer-implemented method according to claim 17, the method comprising:
  deploying the message to the second blockchain to synchronize the state of the second blockchain object with the state of the second blockchain object.

20. The computer-implemented method according to claim 17, wherein the first blockchain object is a cryptlet that is executed in a secure enclave instead of on all peers on a peer-to-peer network.

* * * * *